(12) United States Patent
Satoh

(10) Patent No.: US 7,587,295 B2
(45) Date of Patent: *Sep. 8, 2009

(54) IMAGE PROCESSING DEVICE AND METHOD THEREFOR AND PROGRAM CODES, STORING MEDIUM

(75) Inventor: Kiyohide Satoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

This patent is subject to a terminal disclaimer.

(21) Appl. No.: 11/625,483

(22) Filed: Jan. 22, 2007

(65) Prior Publication Data

US 2007/0120872 A1 May 31, 2007

Related U.S. Application Data

(62) Division of application No. 10/644,829, filed on Aug. 21, 2003, now Pat. No. 7,193,636.

(30) Foreign Application Priority Data

Mar. 6, 2001 (JP) .............................. 2001-062224

(51) Int. Cl.
*G06F 19/00* (2006.01)
*G09G 5/00* (2006.01)
*G06K 9/00* (2006.01)
(52) U.S. Cl. .................... 702/150; 345/633; 382/173
(58) Field of Classification Search ............ 702/94, 702/95, 150; 345/420, 423, 619, 632, 633; 382/173, 190, 195; 348/222.1, 333.02
See application file for complete search history.

(56) References Cited

U.S. PATENT DOCUMENTS

| 5,531,227 A | 7/1996 | Schneider |
| 5,765,561 A | 6/1998 | Chen et al. |
| 5,878,156 A | 3/1999 | Okumura |
| 5,933,530 A | 8/1999 | Kim |
| 6,079,862 A | 6/2000 | Kawashima et al. |
| 6,330,356 B1 | 12/2001 | Sundareswaran et al. |
| 6,369,952 B1 | 4/2002 | Rallison et al. |

(Continued)

FOREIGN PATENT DOCUMENTS

JP  2000-097637 A  4/2000

(Continued)

OTHER PUBLICATIONS

Transactions of the Virtual Reality Society of Japan 1999, vol. 4, No. 4, pp. 607-616, "An Augmented Reality System And Its Calibration Based On Marker Tracking".

(Continued)

*Primary Examiner*—Bryan Bui
(74) *Attorney, Agent, or Firm*—Fitzpatrick, Cella, Harper & Scinto

(57) ABSTRACT

Firstly, a template image is created (S501). Then, an image $I^t$ is photographed (S502). And the sensor output is acquired (S503). A model view matrix $M^t$ is calculated on the basis of the sensor output (S504). And a correction matrix $\Delta M^t$ is calculated (S505). And the model view matrix $M^t$ is corrected employing the calculated correction matrix $\Delta M^t$ (S506). Then CG is drawn and displayed using the corrected model view matrix (S507).

8 Claims, 14 Drawing Sheets

U.S. PATENT DOCUMENTS

| | | | |
|---|---|---|---|
| 6,792,370 | B2 | 9/2004 | Satoh et al. |
| 6,993,450 | B2 | 1/2006 | Takemoto et al. |
| 7,193,636 | B2 * | 3/2007 | Satoh .................. 345/633 |
| 7,227,996 | B2 * | 6/2007 | Imagawa et al. ........... 382/199 |
| 2003/0080976 | A1 | 5/2003 | Satoh et al. |

FOREIGN PATENT DOCUMENTS

| | | |
|---|---|---|
| JP | 2000-275013 A | 10/2000 |
| JP | 2000-350860 A | 12/2000 |

OTHER PUBLICATIONS

Transactions of the Virtual Reality Society of Japan 1999, vol. 4, No. 4, pp. 589-598, "*Accurate Image Overlay On Head-Mounted Displays Using Vision and Accelerometers*".

Transactions of the Virtual Reality Society of Japan 1999, vol. 4, No. 1, pp. 295-302, "*A Registration Method With Vision And 3D Position Sensor*".

Technical Report of the Institute of Electronics Information and Communication Engineers, Dec. 21, 1995, vol. 95, No. 445, pp. 17-24, "*PRU95-169, 3D-CG Oriented Robot Vision*".

Technical Report of the Institute of Electronics Information and Communication Engineers, Jan. 20, 2000, vol. 99, No. 574, pp. 25-32, "*PRU99-195, Virtual Object Synthesis Form Omnidirectional Views By Adaptively Selected Reference Images In Mixed Reality*".

Fixsen et al., "A Balloon-Borne Millimeter-Wave Telescope for Cosmic Microwave Background Anisotropy Measurements", Anstrophysical Journal, Dec. 1995 [arziv.org/pdf/astro=ph/9512006v1].

Suya You et al., "Orientation Tracking for Outdoor Augmented Reality Registration", Virtual Reality, Nov./Dec. 1999, pp. 36-42 (XP00870350).

Omead Amidi et al, "A Visual Odometer for Autonomous Helicopter Flight", Robotics and Autonomous Systems 28 (1999) pp. 185-193 (XP4182626).

Neumann et al., "Natural Feature Tracking for Augmented Reality", IEEE Transactions on Multimedia, vol. 1, No. 1, Mar. 1999, pp. 53-64 (XP11036279).

Ronald Azuma et al., "Improving Static Dynamic Registration in an Optical See-through HMD", Department of Computer Science, University of North Carolina at Chapel Hill, 17pp (XP8070386).

* cited by examiner

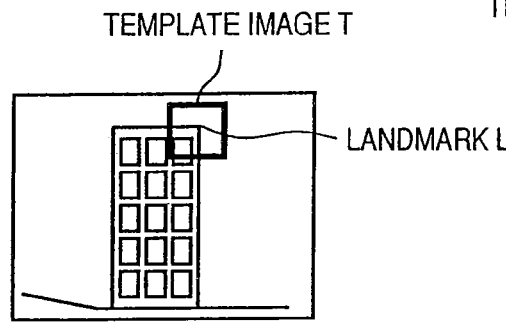
F I G. 14A
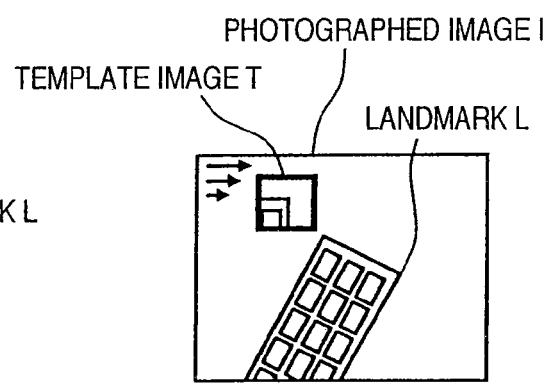
F I G. 14B
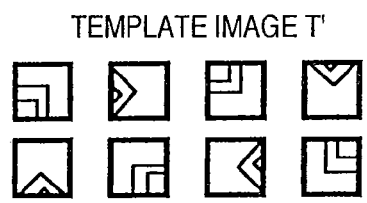
F I G. 14C
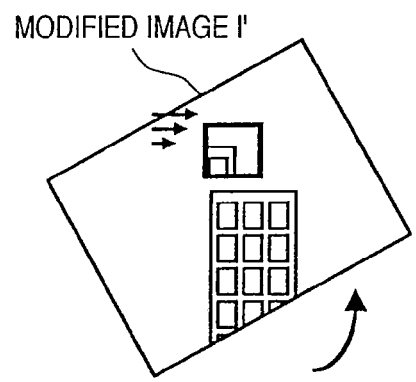
F I G. 14D
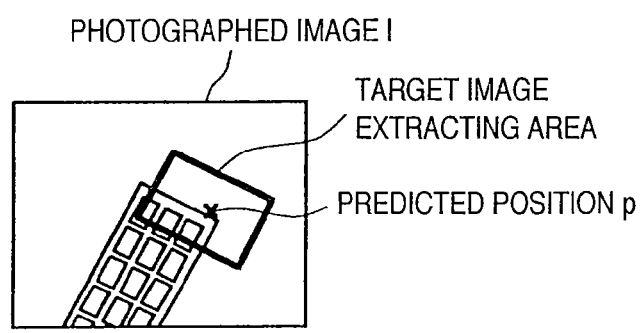
F I G. 14E
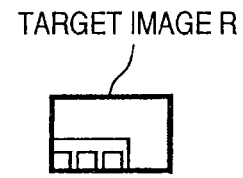
F I G. 14F

IMAGE PROCESSING DEVICE AND METHOD THEREFOR AND PROGRAM CODES, STORING MEDIUM

This application is a division of application Ser. No. 10/644,829 filed Aug. 21, 2003.

TECHNICAL FIELD

The present invention relates to an image processing device and method for outputting the attitude or positional attitude of a measurement object, a program code, and a storage medium.

BACKGROUND ART INVENTION

In recent years, a number of studies regarding a mixed reality ("MR") have been vigorously made.

For the MR, there are provided a video see-through method in which an image in a real space photographed by a photographing apparatus such as a video camera is displayed with an image in a virtual space (e.g., a virtual object or the character information drawn by the computer graphics (hereinafter referred to as CG)) superposed thereon, and an optical see-through method in which an image in the real space is optically transmitted to an HMD (Head-Mounted Display) mounted on the user's head and displayed with an image in the virtual space superposed on a display screen of the HMD.

The applications of MR include the uses of medical assistance for presenting the interior of the patient's body to the physician as seeing through and the uses of work assistance by displaying the real things with an assembling procedure of products in the factory superposed thereon. Therefore, some new fields quite different in quality from the prior VR are expected.

A common requirement for these applications is a technique for making alignment between the real space and the virtual space, for which various attempts have been made up to now.

An alignment problem with the MR of video see-through method results in the problem of correctly attaining the positional attitude at the visual point of the photographing apparatus. Also, an alignment problem with the MR of optical see-through method similarly results in the problem of obtaining the positional attitude at the user's visual point.

In the conventional MR system (particularly an indoor MR system), a method of solving these problems typically involves deriving the positional attitude at the visual point, using a positional attitude sensor such as a magnetic sensor or a ultrasonic sensor.

On one hand, the conventional MR system for outdoors makes use of a gyro sensor to derive the attitude at the visual point (more strictly, a three-axis attitude sensor consisting of a combination of a plurality of gyro sensors for measuring the angular velocities in the three axis directions and a plurality of acceleration sensors for measuring the accelerations in the three axis directions, as a matter of convenience, called a gyro sensor in this specification).

However, when a gyro sensor is used to obtain the attitude at the visual point, the gyro sensor of high precision has a drift error, so that a measurement error will occur in the azimuth direction along with the elapse of time. Also, the gyro sensor is only able to make the attitude measurements, and can not follow the changes in the visual point position. In other words, there may occur some dislocation between the real space and the virtual space along with the elapse of time or the changes in the visual point position.

DISCLOSURE OF INVENTION

The present invention has been achieved in the light of the above-mentioned problems, and it is an object of the invention to measure the attitude or positional attitude at the visual point, and more particularly to correct for an error in the azimuth direction component that may occur along with the elapse of time.

To accomplish the above-mentioned object, an image processing device of the invention comprises, an image pick-up device having the fixed positional relation with a measurement object, an attitude sensor for measuring the attitude at an image pick-up visual point of said image pick-up device, storage means for storing the calculation information to calculate the attitude and/or position of said measurement object on the basis of an output from said attitude sensor, target image setting means for setting a target image that is an object for detecting a predetermined index on the basis of a picked-up image picked up by said image pick-up device, detecting means for detecting the position of said index in said target image by performing a template matching process between a template image of said index and said target image, updating means for updating said calculation information stored in said storage means on the basis of a detected position of said index detected by said detecting means, and calculation means for calculating the attitude and/or position of said measurement object on the basis of said measured value and said calculation information updated by said updating means.

Also, said target image setting means obtains a prediction position of an index in said picked-up image, employing said measured value and said calculation information stored in said storage means, creates an image with a peripheral area around said prediction position in said picked-up image subjected to a rotational process on the basis of a rotational angle of said image pick-up device in a roll direction that is derived from said measured value, and outputs said image as a target image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The features and advantages of the present invention will more fully appear from the following detailed description of the preferred embodiments when read in connection with the accompanying drawings.

FIG. 14A is a view for explaining a basic principle of template matching in this invention;

FIG. 14B is a view for explaining a basic principle of template matching in this invention;

FIG. 14C is a view for explaining a basic principle of template matching in this invention;

FIG. 14D is a view for explaining a basic principle of template matching in this invention;

FIG. 14E is a view for explaining a basic principle of template matching in this invention; and FIG. 14F is a view for explaining a basic principle of template matching in this invention.

BEST MODE FOR CARRYING OUT THE INVENTION

The preferred embodiments of the present invention will be described below in detail with reference to the accompanying drawings.

FIRST EMBODIMENT

In this embodiment, an image processing device for effecting presentation of an MR space without dislocation by correcting for an error of attitude measurement at the visual point of camera with an attitude sensor will be described below.

Figure 2:
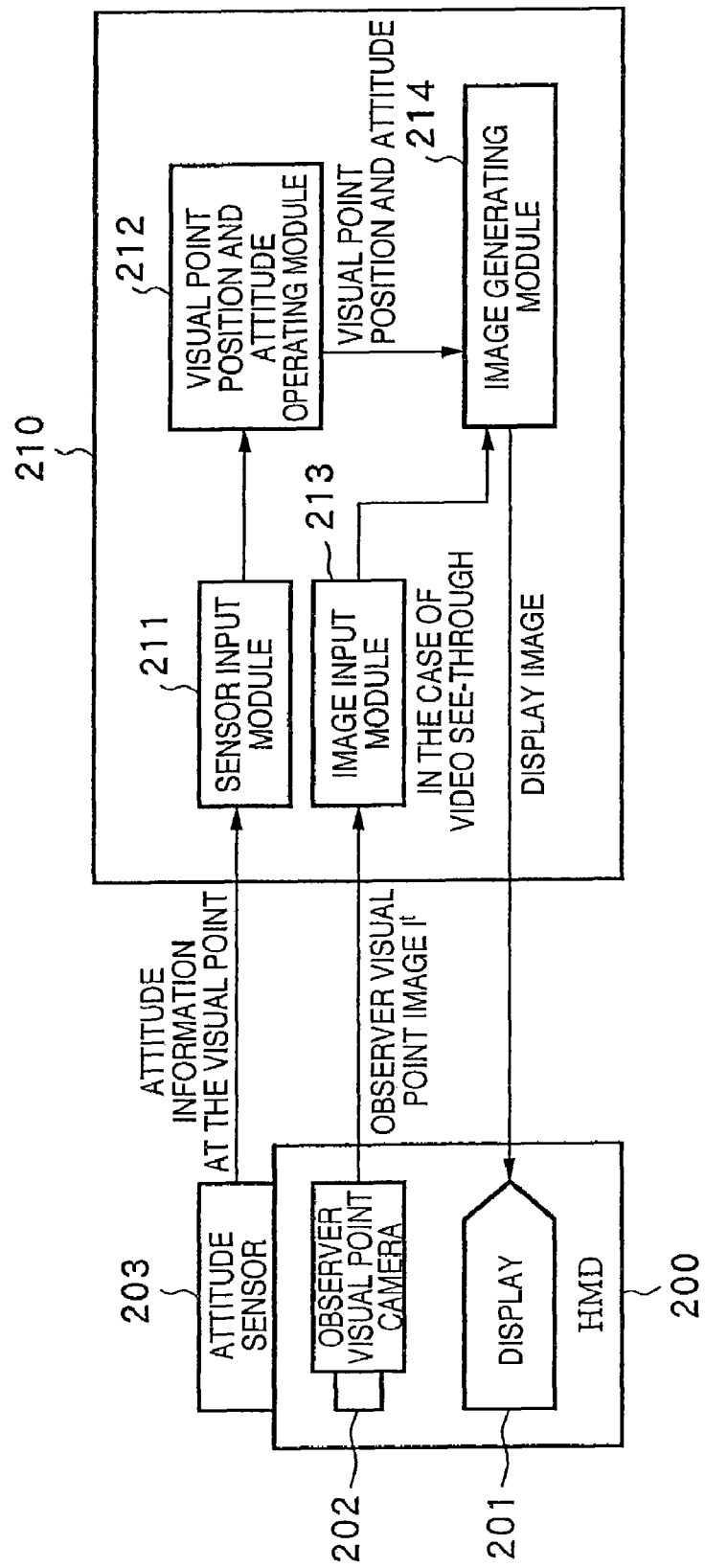
FIG. 2 is a diagram showing the configuration of the conventional image processing device.

FIG. 2 shows the configuration of the conventional image processing device for drawing an image of a real object with an image of a virtual object superposed thereon in accordance with an attitude of the HMD equipped with the attitude sensor.

In FIG. 2, the HMD 200 relies on a video see-through method, and comprises a display 201 for displaying the image, a camera 202 (observer visual point camera) for picking up the image of the real space from the visual point position of the observer having this HMD 200 mounted, and an attitude sensor 203 (e.g., a gyro sensor) for measuring the attitude at the visual point of the camera 202. Also, the image processing device 210 comprises a sensor input module 211 for inputting a sensor output from the attitude sensor 203, an image input module 213 for inputting a photographed image of a real object from the camera 202, a visual point position attitude operating module 212 for generating the information (e.g., 4×4 model view matrix $M^r$) representing the positional attitude at the visual point of the camera 202 on the basis of the attitude at the visual point of the camera 202 input from the sensor input module 211 and the visual point position of the camera 202 obtained in other way, and an image generating module 214 for generating an image consisting of the image of the real object with the image of the virtual object superposed thereon on the basis of the information representing the positional attitude at the visual point operated by the visual point position attitude operating module 212, and provides a presentation image on the display 201. In this case, an image having dislocation that may be caused by an error accumulated in the sensor output along with the elapse of time is displayed on the display 201.

In this embodiment, the visual point position is held in advance in the visual point position attitude operating module 212 as a fixed value. Generally, in the case where the distance to an observation object (real object, virtual object) in an MR space for observation is relatively large with respect to the actual movement amount of the visual point position, there is a nature that more or less error in the visual point position, if any, will not greatly affect the dislocation on the image. In particular, in the uses where the observation object exists far away such as an outdoor MR system, and the observer is standing at one place, it is effective to have the position of visual point as the fixed value. Of course, other positional sensor (e.g., GPS) for measuring the visual point position of the camera 202 is additionally attached to the HMD 200, its output may be input as the visual point position.

In this embodiment, from the above reason, it is assumed that the error of the visual point position is fully small as the relative value, and the dislocation on the image caused by the error of the visual point position is sufficiently negligible.

Figure 3:
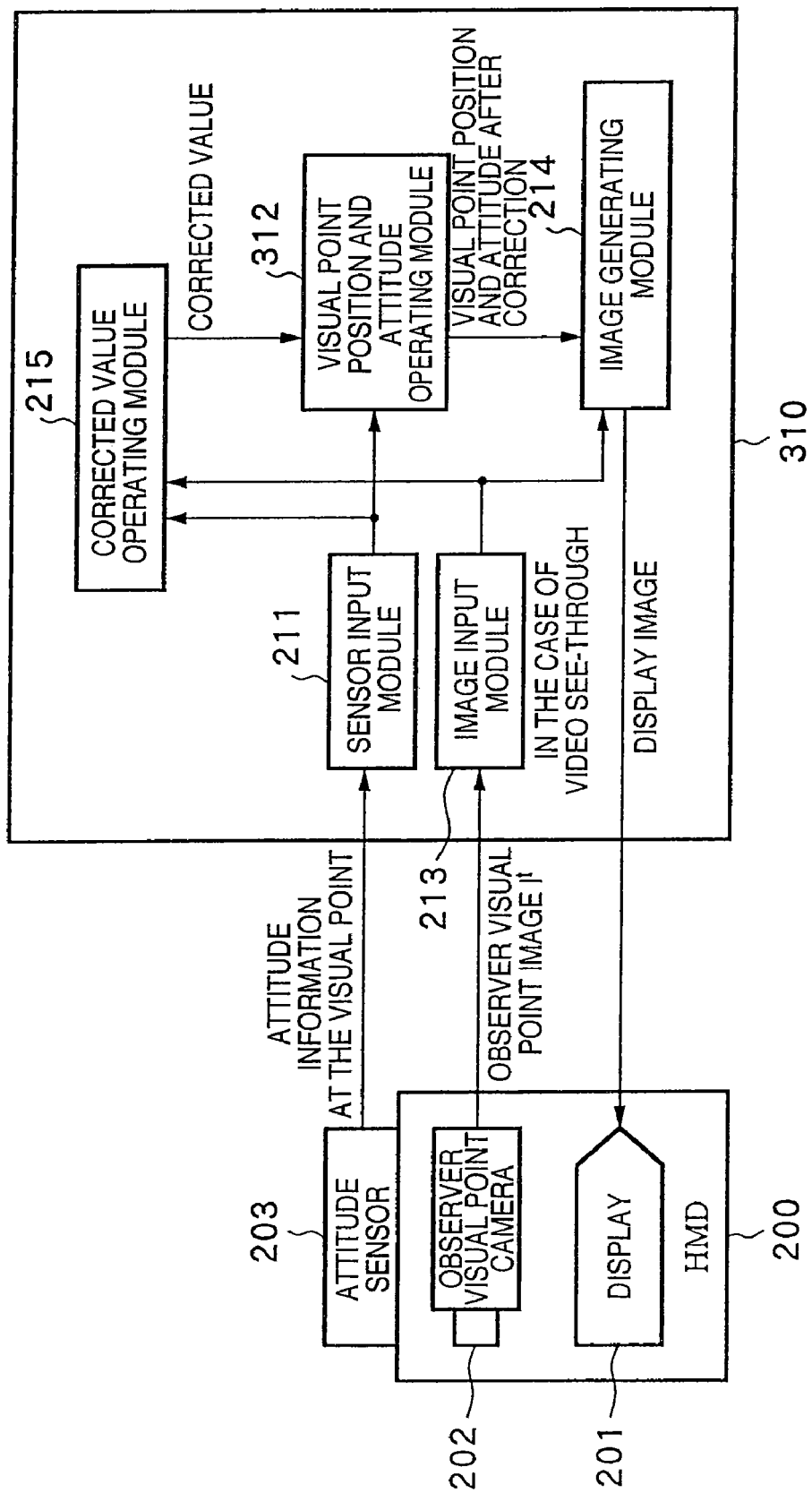
FIG. 3 is a diagram showing the configuration of an image processing device according to a first embodiment of the invention.

FIG. 3 shows the configuration of an image processing device in this embodiment to which the HMD 200 is connected. The like or same parts are designated by the same numerals as in FIG. 2, and are not described here.

In FIG. 3, an image processing device 310 is one in which a corrected value operating module 215 is added to the image processing device 210 as shown in FIG. 2, and further comprises a visual point position attitude operating module 312 that replaces the visual point position attitude operating module 212. This corrected value operating module 215 calculates the corrected value (correction matrix $\Delta M^r$), through a corrected value operation process as will be described later, on the basis of a photographed image input from the image input module 213 and the attitude at the visual point input from the sensor input module 211, and outputs it to the visual point position attitude operating module 312. The visual point position attitude operating module 312 performs an attitude correcting process as will be described later, on the basis of the attitude at the visual point of the camera 202 input from the sensor input module 211, the visual point position of the camera 202 obtained by other method, and the corrected value input from the corrected value operating module 215, correcting the positional attitude information (a model view matrix $M^r$) calculated on the basis of the sensor output, and generating a visual point position attitude information after correction (a corrected model view matrix $MS^r$).

A basic principle of the corrected value operation process in the corrected value operating module 215 will be described below.

The corrected value operation process is basically performed on the basis of the observation prediction position of the landmark on the image predicted from the sensor output and the observation position on the image of the landmark actually detected by the image processing, employing a landmark (e.g., a real object (or a part) that can use the features of an image for its projected image as an index of alignment such as the corner of the building or the roof of the house). Accordingly, it is the maximal point of the corrected value operation process how to detect the observation position of landmark from the image correctly and stably.

In this embodiment, the landmark is detected by template matching employing a template image of landmark.

Generally, in the case of extracting the image features from the image by template matching, the rotation of image features on the image screen is problematical. This rotation of image features is caused when the camera or the photographing object is rotated in a roll direction in the camera coordinate system. For example, in the case that a landmark L is detected from a photographing image I as shown in FIG. 14B, employing a template image T as shown in FIG. 14A, the landmark can not be detected stably, if a search process without regard to the rotation of image features is performed. On one hand, a plurality of template images T' are prepared which is obtained by rotating the template image T (by every 45 degrees in a shown example) in view of rotation of image features, as shown in FIG. 14C, and the search process is performed for each template image to detect the landmark corresponding to the rotation of image features. However, the amount of calculation is increased in proportion to the number of templates, resulting in very high computational load.

In this embodiment, the attitude of the visual point of the camera 202 is measured by the attitude sensor 203. Of the measured values, a value in the azimuth direction has an error accumulated along with the elapse of time, as previously described, but for two axes (i.e., roll direction and pitch direction) other than the azimuth direction, the relatively correct values are acquired. Accordingly, a transformed image I' having the photographed image I rotated is generated on the basis of the rotational angle in the roll direction of the camera 202 that is measured by the attitude sensor 203, as shown in FIG. 14D, and the search process with the template image T on this image I' is performed to detect a landmark not dependent on the rotation of image features.

Further, in this embodiment, the measured values by the attitude sensor 203 have been obtained for the attitude of other two axes, and the attitude corrected value in the former frame has been obtained in the attitude corrected value operating module 215 through the process up to the former frame. Accordingly, a rough position p of landmark on the photographed image I can be predicted based on those values, as shown in FIG. 14E, and the rotation process is performed only in the neighborhood area (a target image extracting area in the figure) around the prediction position to produce a target image R that is subjected to the search process of landmark (FIG. 14F), limiting the search range.

Accordingly, the landmark can be detected by template matching fast and stably.

Figure 4:
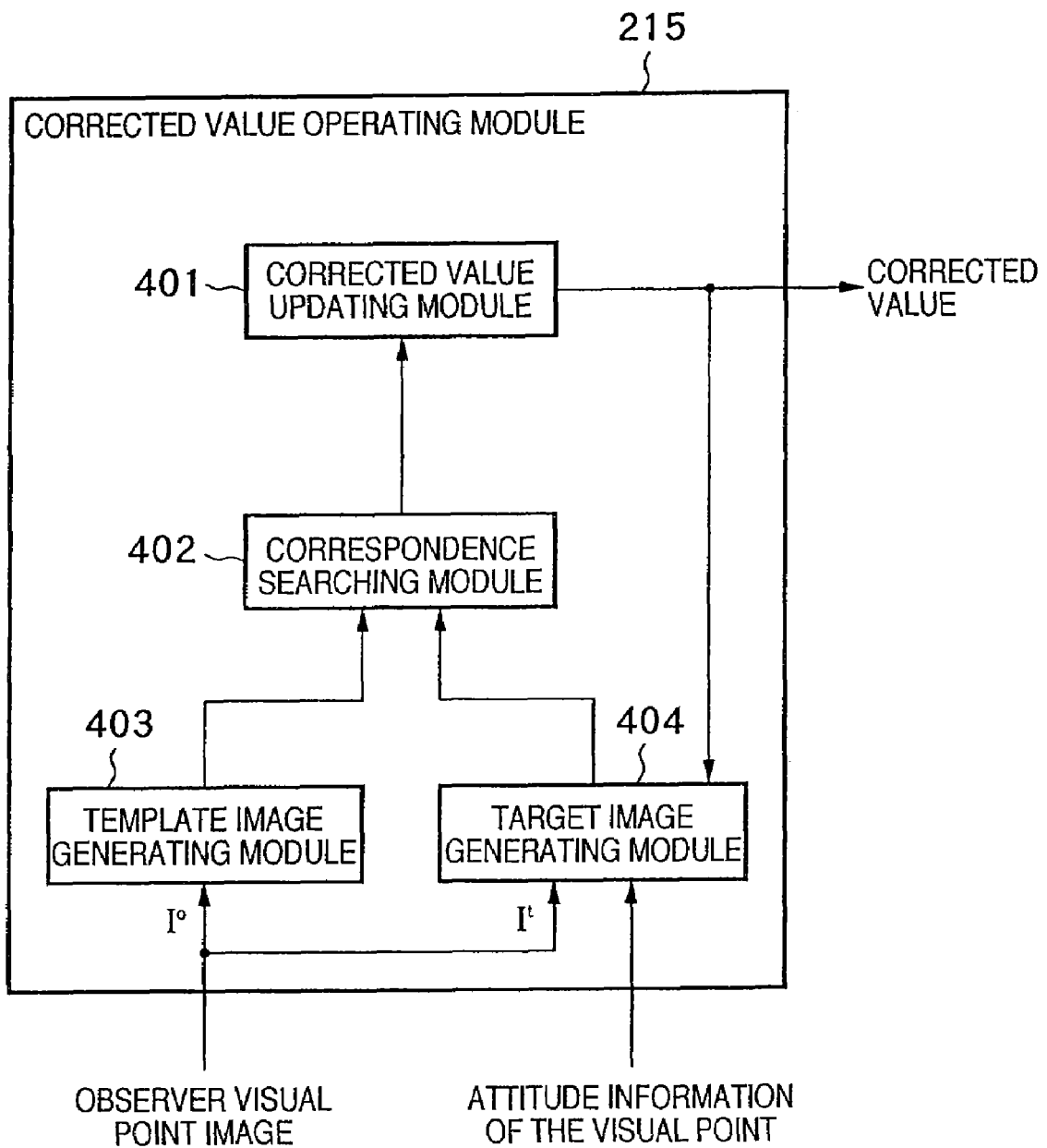
FIG. 4 is a diagram showing a specific configuration of an operating module for corrected value of visual point position attitude 215.

A specific configuration of the corrected value operating module 215 is shown in FIG. 4.

The corrected value operating module 215 comprises a template image generating module 403 for generating a template image on the basis of an image $I^0$ as will be described later, a target image generating module 404 for generating a target image on the basis of an image $I^t$ at time t and the attitude (roll$^t$) of the camera 202, a correspondence searching module 402 for calculating the similarity using the target image and the template image and detecting the position of landmark, and a corrected value updating module 401 for updating the corrected value to the latest corrected value (a correction matrix $\Delta M^t$) in accordance with the position of detected landmark and outputting it.

The variables for use in this embodiment will be described below.

The i-th landmark (i=1, 2, 3, . . . ) is $L_i$.

The position (known) in the world coordinates of landmark $L_i$ is $P_i=(X_i, Y_i, Z_i, 1)^T$.

The predetermined position of camera is $(X^0, Y^0, Z^0)$.

The predetermined attitude of camera for use in generating the template image is (roll$^0$, pitch$^0$, yaw$^0$).

The model view matrix (transformation matrix from the world coordinate system to the camera coordinate system) in the predetermined positional attitude of camera is $M^0$.

The focal length (known) of camera is f.

The projection transformation matrix (transformation matrix from the camera coordinate system to the image coordinate system) of camera is S.

The photographed image in the predetermined positional attitude of camera is $I^0$.

The photographing position on the image $I^0$ of landmark $L_i$ is $pi0=(x_i^0 h_i^0, y_i^0 h_i^0, h_i^0)^T$.

The template image for retrieving the landmark $L_i$ is $T_i$.

The size (predetermined) of template image is N×N.

The range of coordinates of the template image is $xs_T$, $xe_T$, $ys_T$, $ye_T$ (with the fraction part of $xs_T=ys_T=-N/2$ rounded down. $xe_T=ye_T=xs_T+N-1$).

The image photographed at time t is $I^t$.

The attitude value measured by the sensor at time t is (roll$^t$, pitch$^t$, yaw$^t$).

The model view matrix (transformation matrix from the world coordinate system to the camera coordinate system) calculated from the attitude measured value (roll$^t$, pitch$^t$, yaw$^t$) is $M^t$.

The photographing prediction position of landmark $L_i$ on the image $I^t$ is $p_i^t=(x_i^t h_i^t, y_i^t h_i^t, h_i^t)^T$.

The image pick-up position of landmark $L_i$ actually detected on the image $I^t$ is $p\$_i^t=(x\$_i^t, y\$_i^t)$.

The target image subjected to the search process for detecting the landmark $L_i$ from the image $I^t$ is $R_i^t$.

The search range (predetermined) for landmark in the x direction is ±m.

The search range (predetermined) for landmark in the y direction is ±n.

The size of target image is N'×N" (N'=N+2m, N"=N+2n).

The range of coordinates of the target image is $xs_R$, $xe_R$, $ys_R$, $ye_R$ ($xs_R=xs_T-m$, $xe_R=xe_T+m$, $ys_R=ys_T-n$, $ye_R=ye_T+n$).

The detected coordinates of landmark $L_i$ on the target image $R_i^t$ is $(j_i^t, k_i^t)$.

The typical values of detected coordinates $(j_i^t, k_i^t)$ of each landmark are $(j^t, k^t)$.

The corrected updated value of the camera attitude calculated at time t is Δroll, Δpitch, Δyaw.

The corrected updated value of the camera position calculated at time t is Δx, Δy, Δz.

The correction matrix for correcting the model view matrix $M^t$ calculated at time t is $\Delta M^t$.

The correction matrix (at time t−1) already calculated by the prior process is $\Delta M^{t-1}$.

The corrected updated matrix for updating the correction matrix $\Delta M^{t-1}$ to the correction matrix $\Delta M^t$ is $\Delta M'^t$.

The model view matrix after correction which is $M^t$ corrected by the correction matrix $\Delta M^t$ is $M\$^t$.

The model view matrix after correction which is $M^t$ corrected by the correction matrix $\Delta M^{t-1}$ is $M'^t$.

The correction process for an error of attitude measurement in this embodiment will be described below in accordance with the processing flow on the basis of the above settings.

<Creating the Template Image>

Figure 1:
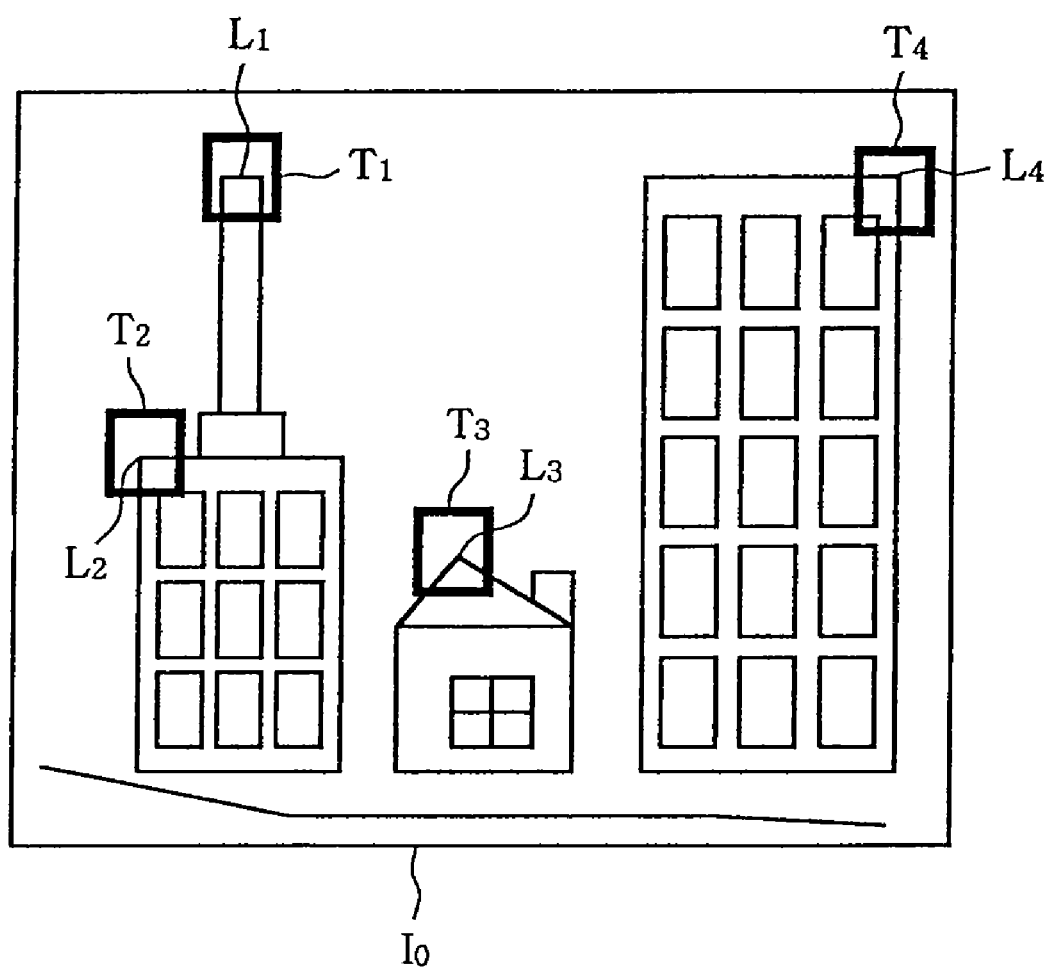
FIG. 1 is a view showing an initial screen I⁰.

Firstly, the camera for photographing the real space is set at a predetermined positional attitude to photograph the image $I_0$. An example of the image $I_0$ is shown in FIG. 1. In the same figure, $L_1$ to $L_4$ are landmarks, the frame sections as indicated by $T_1$ to $T_4$ being extracted as the template images corresponding to the respective landmarks.

Next, the model view matrix $M^o$ is calculated. A calculation method for calculating the model view matrix from the position and attitude of camera is well-known, and is not described herein.

Also, $p_i^o$ is calculated for each landmark ($L_1$ to $L_4$ in FIG. 1) in the photographed image in accordance with the following Equation.

$$p_i^o = SM^o P_i$$

And a template image $T_i$ (in the section as indicated by $T_1$ to $T_4$ in FIG. 1) for each landmark is created by a method as will be described later.

When $\text{roll}^o$ is 0, a rectangular area having a size of N×N centered at ($x_i^o$, $y_i^o$) is extracted from the image $I_0$, and this may be the template image $T_i$. In the template image $T_i$, if the center of image is represented as the coordinates (0, 0), this process can be described in the following way.

$$T_i(j, k) = I^o(x_i^o + j, y_i^o + k)$$

Where $j = xs_T$ to $xe_T$, $k = ys_T$ to $ye_T^o$

On the other hand, when $\text{roll}^o$ is not 0, a rectangular area which is the rectangular area of N×N rotated by $-\text{roll}^o$ at a center of ($x_i^o$, $y_i^o$) is extracted. That is, the template image $T_i$ is created such that for each pixel, $j = xs_T$ to $xe_T$, $k = ys_T$ to $ye_T$ $$T_i(j, k) = I^o(x_i^o + j \cos(-\text{roll}^o) - k \sin(-\text{roll}^o), y_i^o + j \sin(-\text{roll}^o) + k \cos(-\text{roll}^o))$$

<Calculating the Model View Matrix $M^t$ at Each Time>

The model view matrix $M^t$ is calculated on the basis of the sensor output (attitude ($\text{roll}^t$, $\text{pitch}^t$, $\text{yaw}^t$)) at time t and the predetermined camera position ($X^o$, $Y^o$, $Z^o$). A calculation method for calculating the model view matrix from the position and attitude of camera is well-known, and is not described herein.

<Corrected Value Operation Process: Calculation of the Correction Matrix $\Delta M^t$ for Correcting the Model View Matrix $M^t$>

A calculation method for calculating the correction matrix $\Delta M^t$ for correcting the model view matrix $M^t$ will be described below.

Firstly, the model view matrix $M^t$ is corrected, employing the correction matrix $\Delta M^{t-1}$ already calculated in the prior process, calculating the matrix $M'^t$. When this process is performed for the first time (in case of t=0), the correction matrix $\Delta M^{t-1}$ is a unit matrix.

$$M'^t = \Delta M^{t-1} M^t$$

$p_i^t$ is calculated for each landmark in accordance with the following Equation.

$$p_i^t = SM'^t P_i$$

This method is well known, and not described in detail. As a result of calculating the coordinates of each landmark, the landmark having the coordinates outside the coordinate range of the image $I^t$ is excluded from the following processing.

Next, the target image $R_i^t$ is created for each landmark. Specifically, a rectangle which is the rectangular area of N'×N" rotated by $-\text{roll}^t$ at a center of ($x_i^t$, $y_i^t$) that are the local coordinates of the same image from the image $I^t$ is extracted.

That is, the following transformation is made for each pixel, $j = xs_T$ to $xe_T$, $k = ys_T$ to $ye_T$ $$R_i^t(j, k) = I^t(x_i^t + j \cos(-\text{roll}^t) - k \sin(-\text{roll}^t), y_i^t + j \sin(-\text{roll}^t) + k \cos(-\text{roll}^t))$$

Then, for each landmark, the target image $R_i^t$ and the template image $T_i$ are matched to obtain the landmark position ($j_i^t$, $k_i^t$) on the target image. A specific processing of a method for obtaining the landmark position will be described below.

First of all, the similarity e(j, k) between the rectangular area centered at the coordinates (j, k) on the target image $R_i^t$ and the template image $T_i$ is calculated. The calculation of the similarity can be made by cross-correlation or SSD (Sum of Squared Difference), for example, but may be made by any of the well-known template matching methods. This similarity e(j, k) is calculated for all j and k (j=−m to m, k=−n to n), and (j, k) for the maximum similarity e(j, k) is ($j_i^t$, $k_i^t$).

And the typical value ($j^t$, $k^t$) is calculated from ($j_i^t$, $k_i^t$) obtained for each landmark. The calculation of the typical value can be made by calculating the average value or median value of ($j_i^t$, $k_i^t$) obtained for each landmark. Using only the landmarks having the similarity e($j_i^t$, $k_i^t$) larger than a predetermined threshold for ($j_i^t$, $k_i^t$) obtained for each landmark, the detected results with low reliability can be excluded. In this case, if the number of landmarks having the similarity e($j_i^t$, $k_i^t$) larger than or equal to the threshold is a predetermined number or less, the corrected value operation process at time t may be aborted.

Then, the correction matrix $\Delta M^t$ is updated on the basis of the detected result of landmark.

First of all, the corrected updated values $\Delta\text{roll}$, $\Delta\text{pitch}$, $\Delta\text{yaw}$ of the camera attitude is obtained in the following way.

$$\Delta\text{roll} = 0$$

$$\Delta\text{pitch} = \arctan(k^t/f)$$

$$\Delta\text{yaw} = \arctan(j^t/f)$$

Since it is assumed that the camera position is fixed, the corrected updated values of position $\Delta x$, $\Delta y$, $\Delta z$ are all 0.

Next, the corrected updated matrix $\Delta M'^t$ is calculated as the model view matrix that is determined by the attitude $\Delta\text{roll}$, $\Delta\text{pitch}$, $\Delta\text{yaw}$, and the position $\Delta x$, $\Delta y$, $\Delta z$. A calculation method for calculating the model view matrix from the position and attitude of camera is well-known, and is not described herein.

And the correction matrix $\Delta M^t$ after update is calculated from the correction matrix $\Delta M^{t-1}$ and the corrected updated matrix $\Delta M'^t$ as obtained above in accordance with the following Equation.

$$\Delta M^t = \Delta M'^t \Delta M^{t-1}$$

<Positional Attitude Correcting Process: Calculating the Model View Matrix $M\$^t$ after Correction>

The model view matrix $M\$^t$ after correction at time t can be obtained in accordance with the following Equation.

$$M\$^t = \Delta M^t M^t$$

And if the model view matrix $M\$^t$ after correction is used to draw and display CG, the dislocation in the azimuth direction along with the elapse of time can be relieved even by the use of a gyro sensor.

The flowcharts of FIGS. 5 to 7 for the correction process in this embodiment will be described below.

Figure 5:
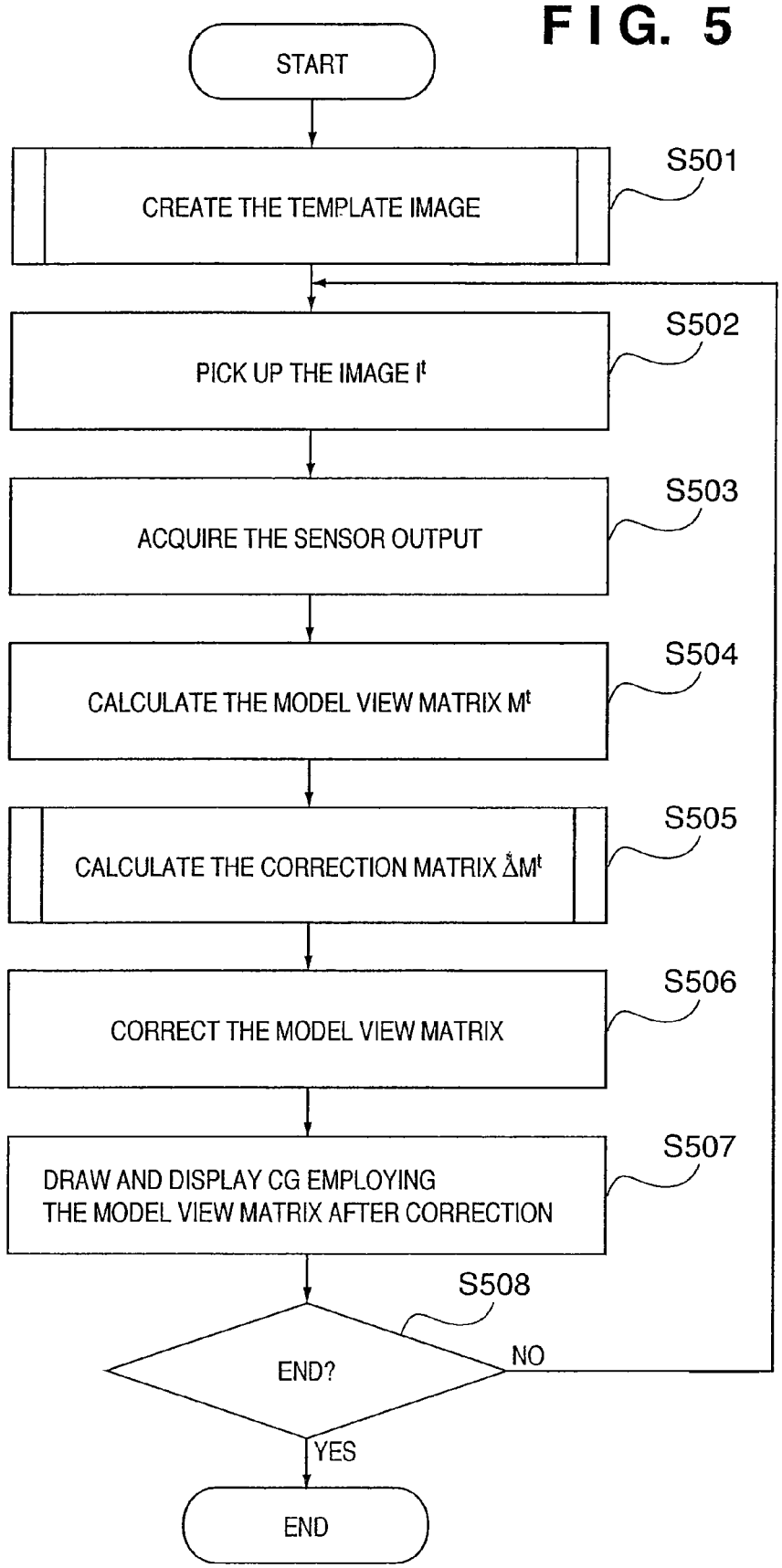
FIG. 5 is a flowchart showing a main process in the first embodiment of the invention.

FIG. 5 is a flowchart of a main routine of the correction process.

Firstly, a template image is created (step S501). A flowchart for the specific process of creating the template image is shown in FIG. 6.

First of all, an image $I^o$ is input from the camera fixed at the predetermined positional attitude (step S601). Then the model view matrix $M^o$ is calculated on the basis of the positional attitude of camera at this time (step S602). Then $p_i^o$ is calculated for all i (or all landmarks) (steps S603, S604). Then, the template image is created. The creation method involves, as above described, calculating the pixel values for all j, k within the above range for each landmark, and storing them in the coordinates (j, k) of the template image $T_i$ (steps S606 to S608).

Figure 6:
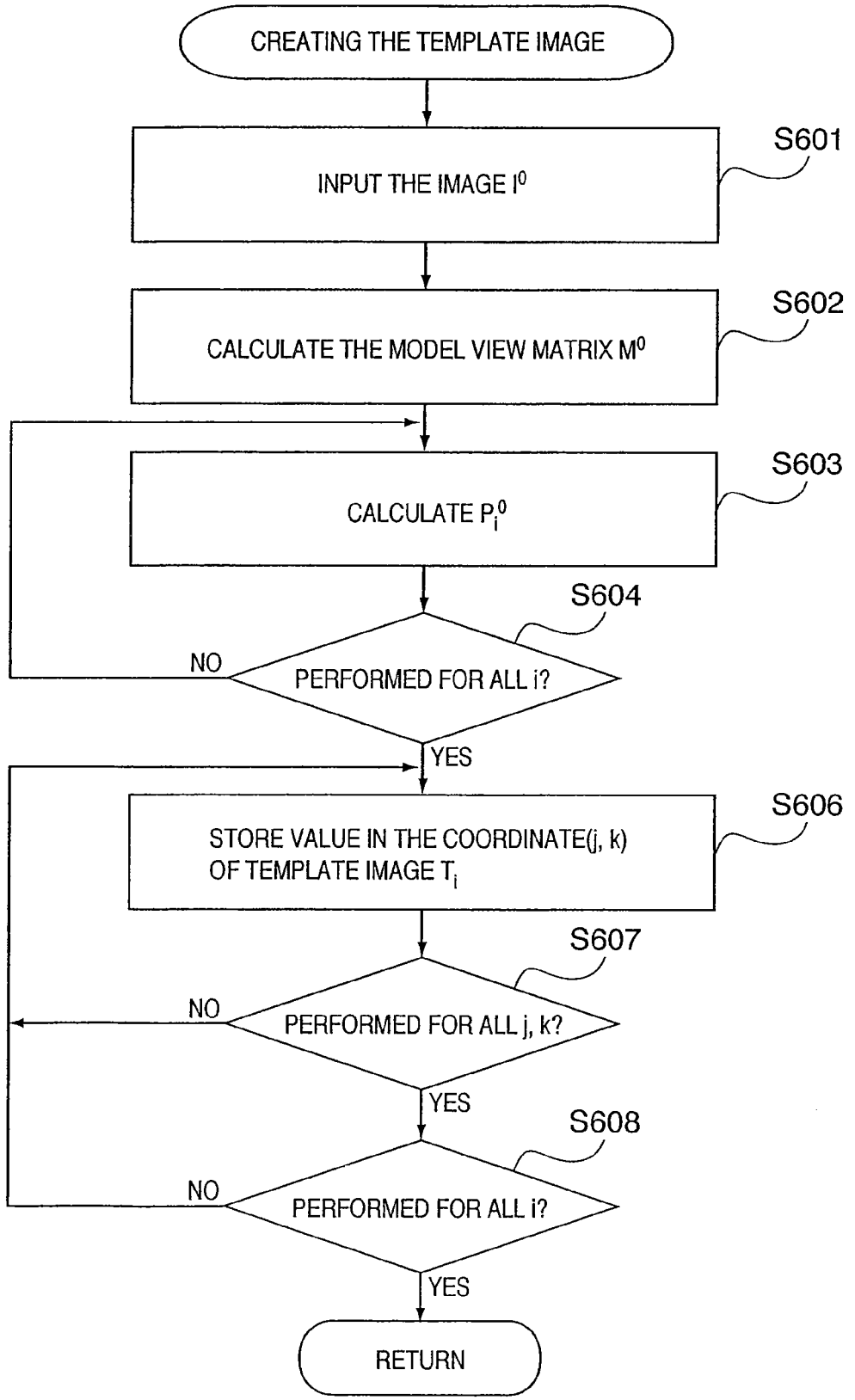
FIG. 6 is a flowchart for a specific process of creating a template image.

If the template image is created in accordance with the procedure as shown in FIG. 6, the control returns to the routine of FIG. 5, and an image $I^t$ is photographed (step S502). Then, the sensor output is acquired (step S503). The steps S502 and S503 are not performed in this order, but may be reversed, or performed concurrently in synchronism.

Then the model view matrix $M^t$ is calculated on the basis of the sensor output (step S504). And the correction matrix $\Delta M^t$ is calculated (step S505). A flowchart for the specific process in calculating the correction matrix $\Delta M^t$ is shown in FIG. 7, and described below.

Firstly, the model view matrix $M^t$ is corrected by the correction matrix $\Delta M^{t-1}$ to obtain the model view matrix $M^{t\prime}$ (step S701). And $p_i^t$ is calculated for all I or all landmarks (steps S702, S703). The calculated $p_i^t$, which is outside the range of the image $I^t$, is excluded from the following process.

Then, the target image $R_i^t$ is calculated for each landmark (steps S704 to S706). And the matching between the target image $R_i^t$ and the template image $T_i$ is made to calculate the similarity e(j, k) for each of j, k (steps S707, S708). And (j, k) at which the similarity e(j, k) is maximum is made $(j_i^t, k_i^t)$ (step S709). The above process from step S707 to S709 is performed for all i or all landmarks (step S710).

The average value of $(j_i^t, k_i^t)$ obtained is computed to obtain $(j^t, k^t)$ (step S711). Also, the corrected value of the positional attitude of camera is obtained (step S712), and the corrected updated matrix $\Delta M^{t\prime}$ is obtained (step S713), and lastly the correction matrix $\Delta M^t$ is obtained (step S714).

Figure 7:
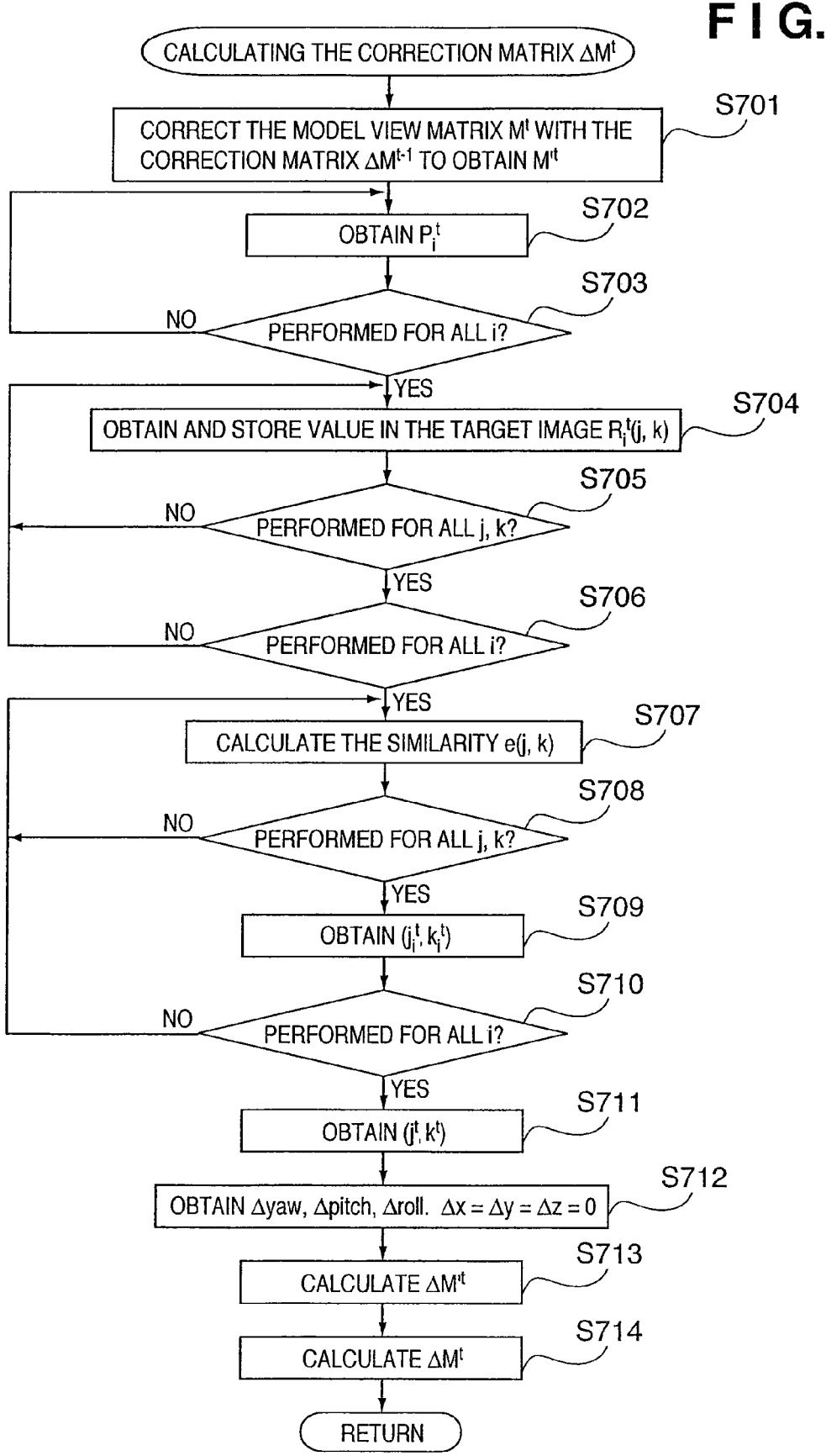
FIG. 7 is a flowchart for a specific process of calculating a correction matrix$\Delta M^r$.

The correction matrix $\Delta M^t$ is calculated in accordance with the procedure as shown in FIG. 7. Then the control returns to the routine of FIG. 5 to correct the model view matrix $M^t$ using the calculated correction matrix $\Delta M^t$ (step S506).

And CG is drawn and displayed using the model view matrix after correction $M\$^t$ (step S507).

As described above, the image processing device and method of this invention allows the MR without dislocation to be implemented by correcting for an error of attitude measurement at the visual point of camera with the attitude sensor.

SECOND EMBODIMENT

In the first embodiment, the correction process is performed in a single loop (drawing loop). In this case, it is not possible to acquire sufficiently the frame rate of drawing due to the computational load of the image processing. In other words, if the image processing is simplified (or reduced in computation amount) to secure the frame rate of drawing, the correction precision can not be sufficiently attained.

Thus, in this embodiment, the drawing loop and the correction operation loop are divided and operated at independent update periods (e.g., the drawing loop is 60 Hz and the correction operation loop is 1 loop/second). Also, the processing device in this embodiment may be the same image processing device as used in the first embodiment.

<Drawing Loop>

Basically, the processing is performed in accordance with the flowcharts as shown in FIGS. 5 and 6, except that the latest correction matrix $\Delta M^s$ passed from a correction operation loop as will be described later is obtained to have $\Delta M^t$ at step S505.

<Correction Operation Loop>

Figure 8:
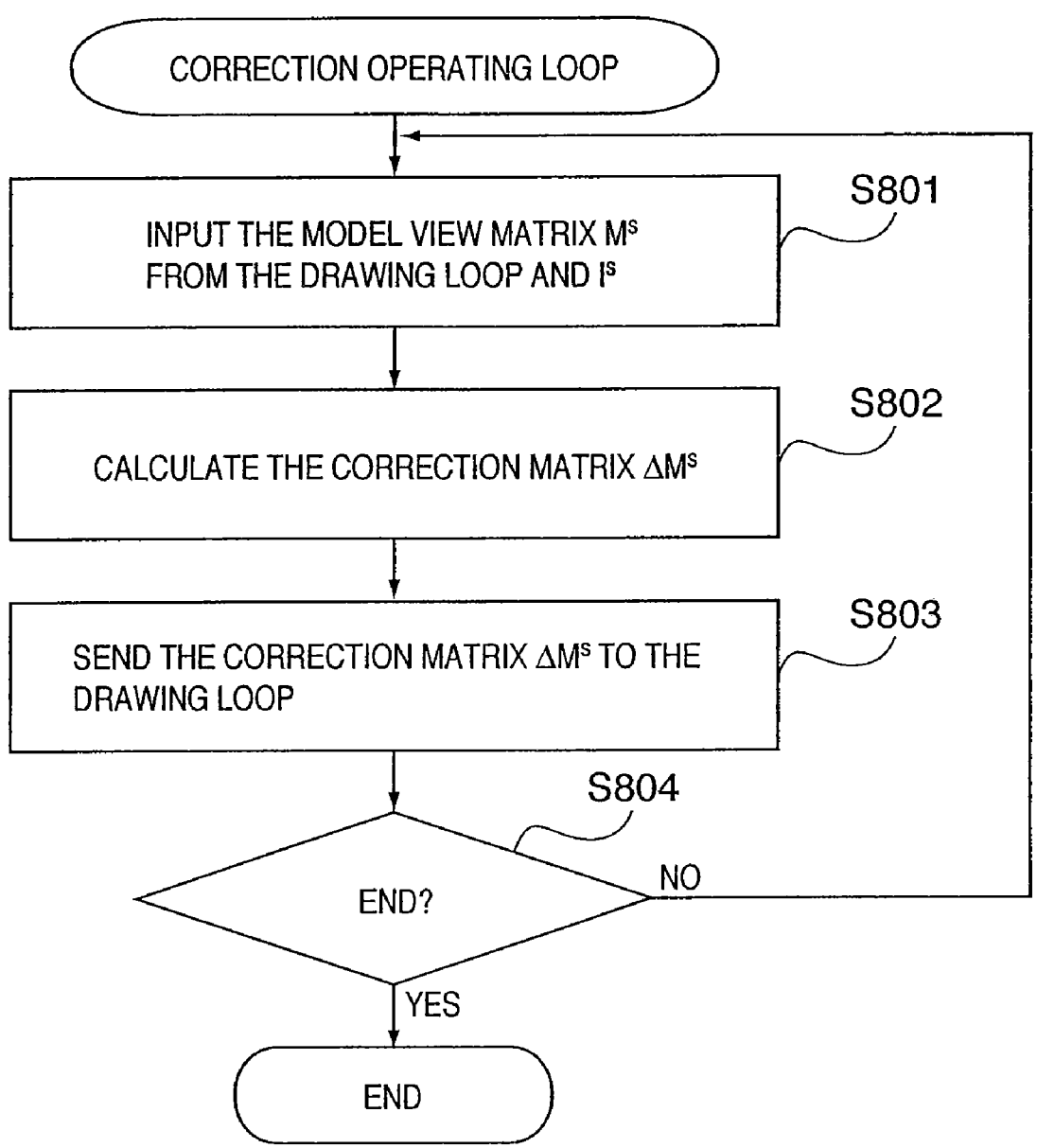
FIG. 8 is a flowchart for a correcting operation loop process in a second embodiment of the invention.

FIG. 8 shows a flowchart of a correction operation loop process. Firstly, the image $I^s$ at time s and the model view matrix $M^s$ at that time are input from the drawing loop (step S801). The correction matrix $\Delta M^s$ is calculated in the same manner as at step S505 as described in the first embodiment (step S802). And the calculated correction matrix $\Delta M^s$ is sent to the drawing loop (step S803). The above process is repeated until an end permission is given (step S804).

In this embodiment, the drawing loop and the correction operation loop are divided, and performed in one image processing device (as an example), but these loops may be performed in separate computers. And these loops are in communication between those computers to transmit or receive the processing results. In this way, the number of processes for each computer to handle is reduced, resulting in faster processes.

THIRD EMBODIMENT

In the second embodiment, in the correction process of the model view matrix, the model view matrix after correction $M\$^t$ is obtained by a simple product operation between the correction matrix $\Delta M^t$ and the model view matrix $M^t$ through the use of the sensor. However, since updating the correction matrix occurs at a larger interval than the drawing period, it can not be said that the correction matrix necessarily represents the appropriate correction information at the current frame (time t).

Thus, in this embodiment, the correction matrix $\Delta M^t$ appropriate at time t is calculated, employing the past correction matrix obtained through the correction operation loop at step S505 in the second embodiment.

Firstly, the correction matrix $\Delta M^s$ obtained at time s is expanded to calculate the corrected value $\Delta yaw^s$ in the azimuth direction of the camera attitude and the corrected value $\Delta pitch^s$ in the pitch direction. The method for obtaining individual rotational components from the model view matrix is well-known and not described herein. The same processing is performed at time s−1, and the corrected values $\Delta yaw^t$ and $\Delta pitch^t$ of the camera attitude at time t are obtained in the following way.

$$\Delta yaw^t = \Delta yaw^s + (\Delta yaw^s - \Delta yaw^{s-1}) \Delta st/\Delta s$$

$$\Delta pitch^t = \Delta pitch^s + (\Delta pitch^s - \Delta pitch^{s-1}) \times \Delta st/\Delta s$$

Herein, $\Delta st$ is the elapsed time from time s to time t, and $\Delta s$ is the elapsed time from time s−1 to time s.

And employing the corrected values $\Delta yaw^t$ and $\Delta pitch^t$ thus obtained, the correction matrix $\Delta M^t$ is calculated. As a result, the correction matrix appropriate for the current frame (time t) can be calculated by employing a calculation method of the correction matrix in this embodiment.

In this embodiment, the extrapolation of corrected value is effected by the linear prediction of first order as shown in the above Equation, but the prediction method of corrected value is not limited thereto, and the linear prediction of second order or other prediction methods may be employed.

FOURTH EMBODIMENT

In this embodiment, a method for making correction more accurately than in the first embodiment will be described below.

First of all, the variables used in this embodiment different from those of the above embodiments will be described below.

Rotational component of the model view matrix based on the sensor output at time t is $R^t$.

Parallel movement component of the model view matrix based on the predetermined position of camera is $T^t$.

Detected position of landmark $L_i$ on the image $I^t$ is $p\$_i^t = (x\$_i^t, y\$_i^t)$.

Position of "projected point onto the image $I^t$" for the landmark $L_i$ in the camera coordinate system is $pc_i^t$.

Corrected updated matrix of the model view matrix obtained from the landmark $L_i$ (rotational component in the azimuth direction) is $\Delta R_i^{\prime t}$ Corrected updated value in the yaw direction obtained from the landmark $L_i$ is $\Delta yaw_i^t$.

Corrected updated value in the yaw direction obtained from all landmarks is $\Delta yaw^t$.

Correction matrix of the model view matrix (rotational component in the azimuth direction) is $\Delta R^t$.

Correction matrix already calculated in the prior process is $\Delta R^{t-1}$ (a unit matrix in the first loop).

Rotational component of the model view matrix corrected by the correction matrix $\Delta R^{t-1}$ is $R'^t$.

Model view matrix corrected by the correction matrix $\Delta R^{t-1}$ is $M'^t$.

Corrected updated matrix for updating the correction matrix $\Delta R^{t-1}$ to the correction matrix $\Delta R^t$ (rotational component in the azimuth direction) is $\Delta R'^t$.

Figure 9:
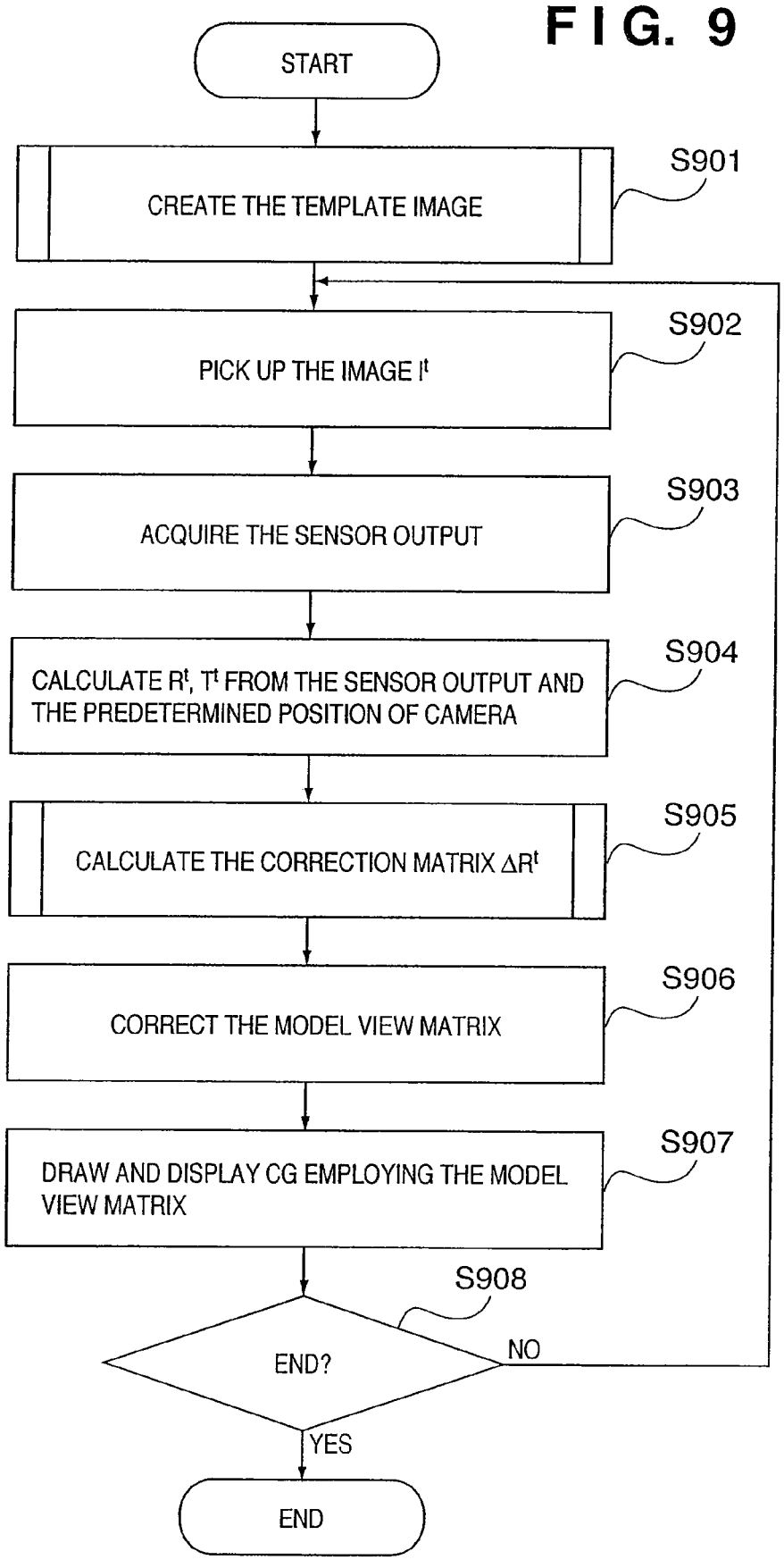
FIG. 9 is a flowchart for a main process in a fourth embodiment of the invention.
Figure 10:
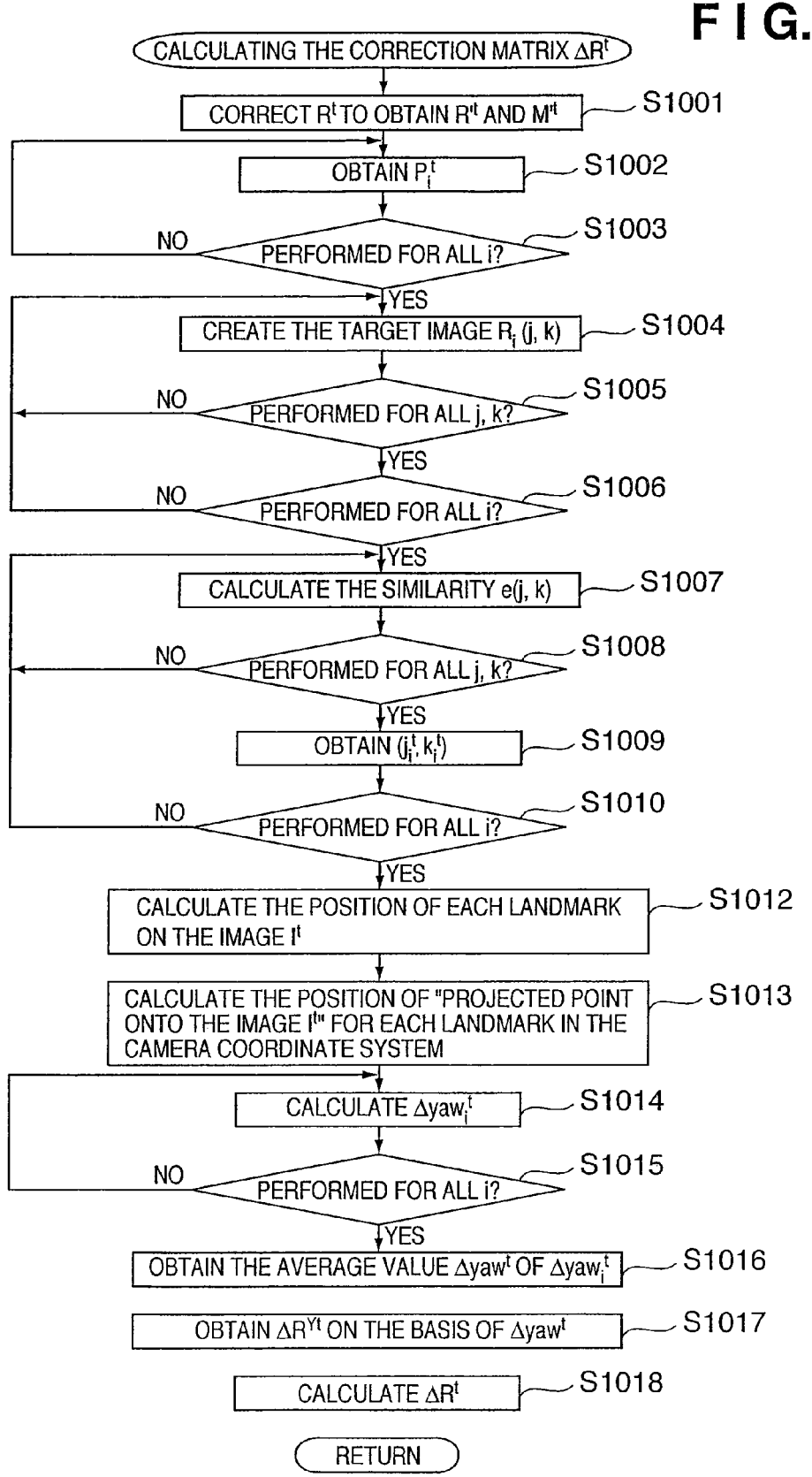
FIG. 10 is a flowchart for a specific process of obtaining a correction matrix$\Delta R^r$.

A correction method on the basis of the above settings in this embodiment will be described below with reference to FIGS. 9 and 10 showing the flowcharts of the processing for the same method.

FIG. 9 is a flowchart of a main process in this embodiment. The processing from step S901 to step S903 is the same as that from step S501 to step S503 in the first embodiment, and not described here.

Then, the rotational component $R^t$ and parallel movement component $T^t$ of the model view matrix are calculated (step S904). Specifically, the rotational component $R^t$ is calculated on the basis of the sensor output (or the attitude of camera obtained from the sensor output) ($roll^t$, $pitch^t$, $yaw^t$) by a well-known method. On the other hand, the parallel movement component $T^t$ is calculated on the basis of the visual point position of camera by a well-known method.

And the correction matrix $\Delta R^t$ is obtained (step S905). FIG. 10 shows a flowchart of the specific processing for calculating the correction matrix $\Delta R^t$, which will be described below.

Firstly, the matrix $R^t$ is corrected with the correction matrix $\Delta R^{t-1}$ already calculated in the prior process to obtain the matrix $R'^t$.

$$R'^t = R^t \Delta R^{t-1}$$

Next, the matrix $M'^t$ is obtained in the following way, using the matrix $R'^t$ (step S1001).

$$M'^t = R'^t T^t$$

The processing from step S1002 to step S1010 is the same as that from step S702 to step S710 in the above embodiment, and not described here.

Then, the position $p\$_i^t = (x\$_i^t, y\$_i^t)$ of each landmark on the image $I^t$ is calculated using $(j_i^t, k_i^t)$ obtained (step S1012). This calculation is made in accordance with the following Equation.

$$x\$_i^t = x_i^t + j_i^t \cos(-roll^t) - k_i^t \sin(-roll^t)$$

$$y\$_i^t = y_i^t + j_i^t \sin(-roll^t) + k_i^t \cos(-roll^t)$$

And the position $pc_i^t$ of "projected point onto the image $I^t$" for the landmark in the camera coordinate system is calculated (step S1013).

$$pc_i^t = (x\$_i^t, y\$_i^t, -f, 1)^T$$

Then, supposing that a is a scaling parameter, $pc_i^t \cdot a = R'^t \Delta R_i'^t T^t P_i$ holds. Solving this equation, $\Delta yaw_i^t$ is calculated. This method is shown below. In the following, Inv (M) is an inverse matrix of the matrix M.

Assuming that $$P\$_i^t = (X\$_i^t, Y\$_i^t, Z\$_i^t, 1)^T = \text{Inv}(R'^t) pc_i^t$$

$$P'_i = (X'_i, Y'_i, Z'_i, 1) = T^t P_i$$

Consequently, $$P\$_i^t = \Delta R_i'^t P'_i / a$$

Therefore, $$X\$_i^t = \{\cos(\Delta yaw_i^t) X'_i - \sin(\Delta yaw_i^t) Z'_i\}/a$$

$$Z\$_i^t = \{\sin(\Delta yaw_i^t) X'_i + \cos(\Delta yaw_i^t) Z'_i\}/a$$

Solving the above equations, $$\Delta yaw_i^t = \arctan\{(Z\$_i^t \cdot X'_i - X\$_i^t \cdot Z'_i)/(X\$_i^t \cdot X'_i + Z\$_i^t \cdot Z'_i)\}$$

(step S1014). The processing at step S1014 is repeated for all I, or for all landmarks (step S1015). And the average value $\Delta yaw^t$ of $\Delta yaw_i^t$ for all I is obtained (step S1016).

And the corrected updated matrix $\Delta R'^t$ is obtained using the corrected updated value $\Delta yaw^t$ (step S1017). A method for calculating the model view matrix to rotate the coordinate system in the azimuth direction by an arbitrary angle (here $\Delta yaw^t$) is well known, and not described here. Employing this corrected updated matrix $\Delta R'^t$, the correction matrix $\Delta R^t$ is obtained in the following way (step S1018).

$$\Delta R^t = \Delta R^{t-1} \Delta R'^t$$

After the correction matrix $\Delta R^t$ is calculated in accordance with the procedure as shown in FIG. 10, the control returns to the main routine of FIG. 9. Then the model view matrix $M\$^t$ is calculated using the correction matrix $\Delta R^t$ calculated (step S906). This calculation is made in accordance with the following Equation.

$$M\$^t = R^t \Delta R^t T^t$$

And CG is drawn and displayed using the model view matrix calculated in the same manner as in the first embodiment (step S907).

FIFTH EMBODIMENT

In the first to fourth embodiments, it is assumed that the visual point position is known, and the attitude (direction, angle) is only corrected. As described previously, in the case that the distance to the observation object is relatively greater than the movement amount of the visual point position, it is effective that the visual point position is a fixed value. However, if that assumption is invalid, the dislocation is caused by the movement of the visual point. Hence, in this embodiment, a method for correcting the visual point position is described. In this embodiment, it is assumed that the movement amount $\Delta Tz$ in the Z axis direction (i.e., the depth direction, or direction perpendicular to the photographing place) in the camera coordinate system is always 0. Also, for the rotational component, it is assumed that the correct value has been acquired by the sensor. If this assumption holds, the position can be corrected by detecting one landmark at minimum.

Herein, the settings in this embodiment are listed in the following.

Rotational component of the model view matrix based on the sensor output at time t is $R^t$.

Parallel movement component of the model view matrix based on the predetermined position of camera at time t is $T^t$.

Correction matrix of the model view matrix (parallel movement component in the world coordinate system) is $\Delta T^t$.

Correction matrix of the model view matrix obtained from the landmark $L_i$ (parallel movement component in the world coordinate system) is $\Delta T_i^t$.

Correction matrix already calculated in the prior process is $\Delta T^{t-1}$ (a unit matrix in the start loop).

Parallel movement component of the model view matrix corrected by the correction matrix $\Delta T^{t-1}$ is $T'^t$.

Model view matrix corrected by the correction matrix $\Delta T^{t-1}$ is $M'^t$.

Corrected updated matrix of the model view matrix (parallel movement component in the camera coordinate system) is $\Delta Tc^t$.

Corrected updated value in the x axis direction (in the camera coordinate system) obtained from the landmark $L_i$ is $\Delta Tx_i^t$.

Corrected updated value in the y axis direction (in the camera coordinate system) obtained from the landmark $L_i$ is $\Delta Ty_i^t$.

Corrected updated value in the x axis direction (in the camera coordinate system) obtained from all landmarks is $\Delta Tx^t$.

Corrected updated value in the y axis direction (in the camera coordinate system) obtained from all landmarks is $\Delta Ty^t$.

Figure 11:
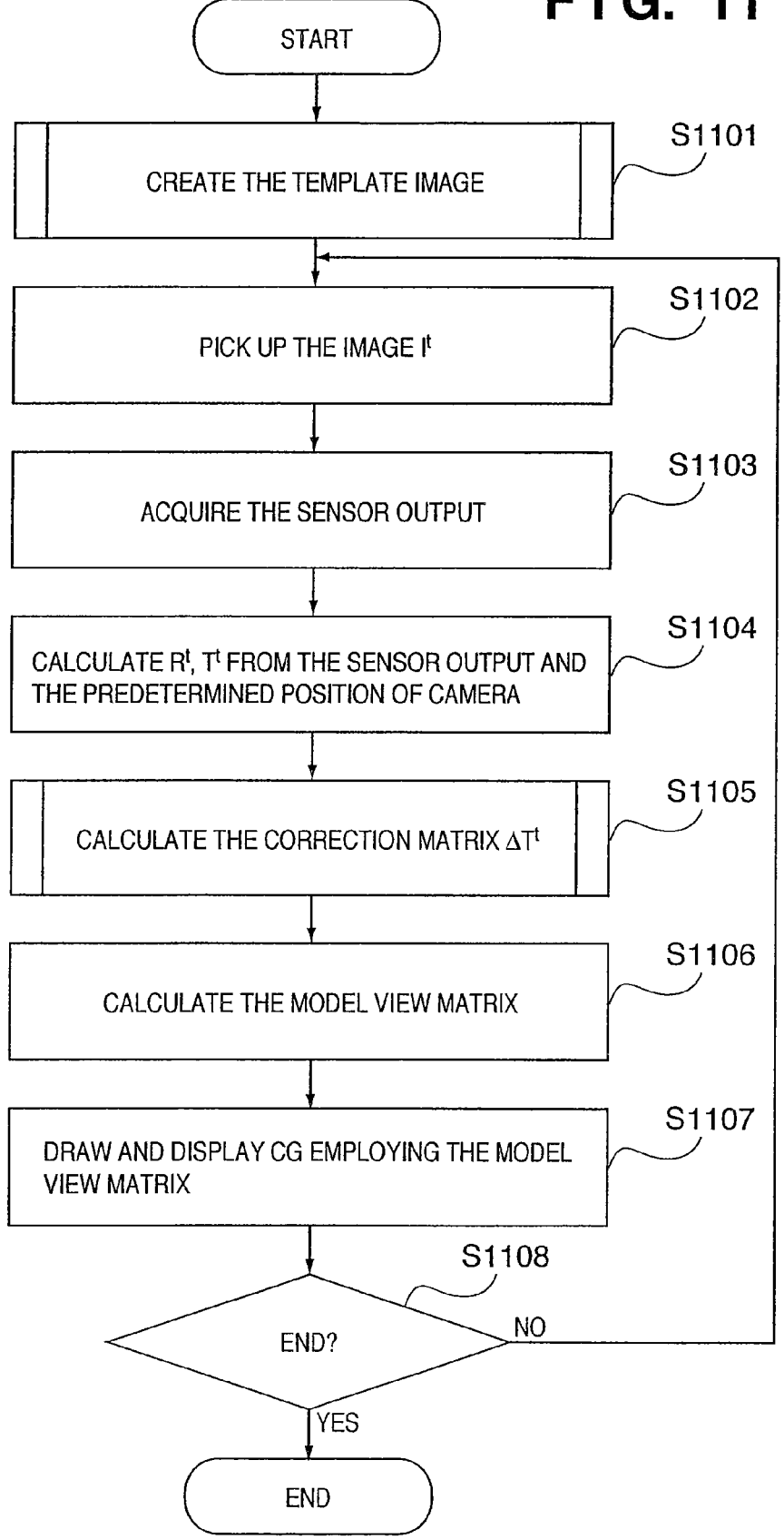
FIG. 11 is a flowchart for a main process in a fifth embodiment of the invention.
Figure 12:
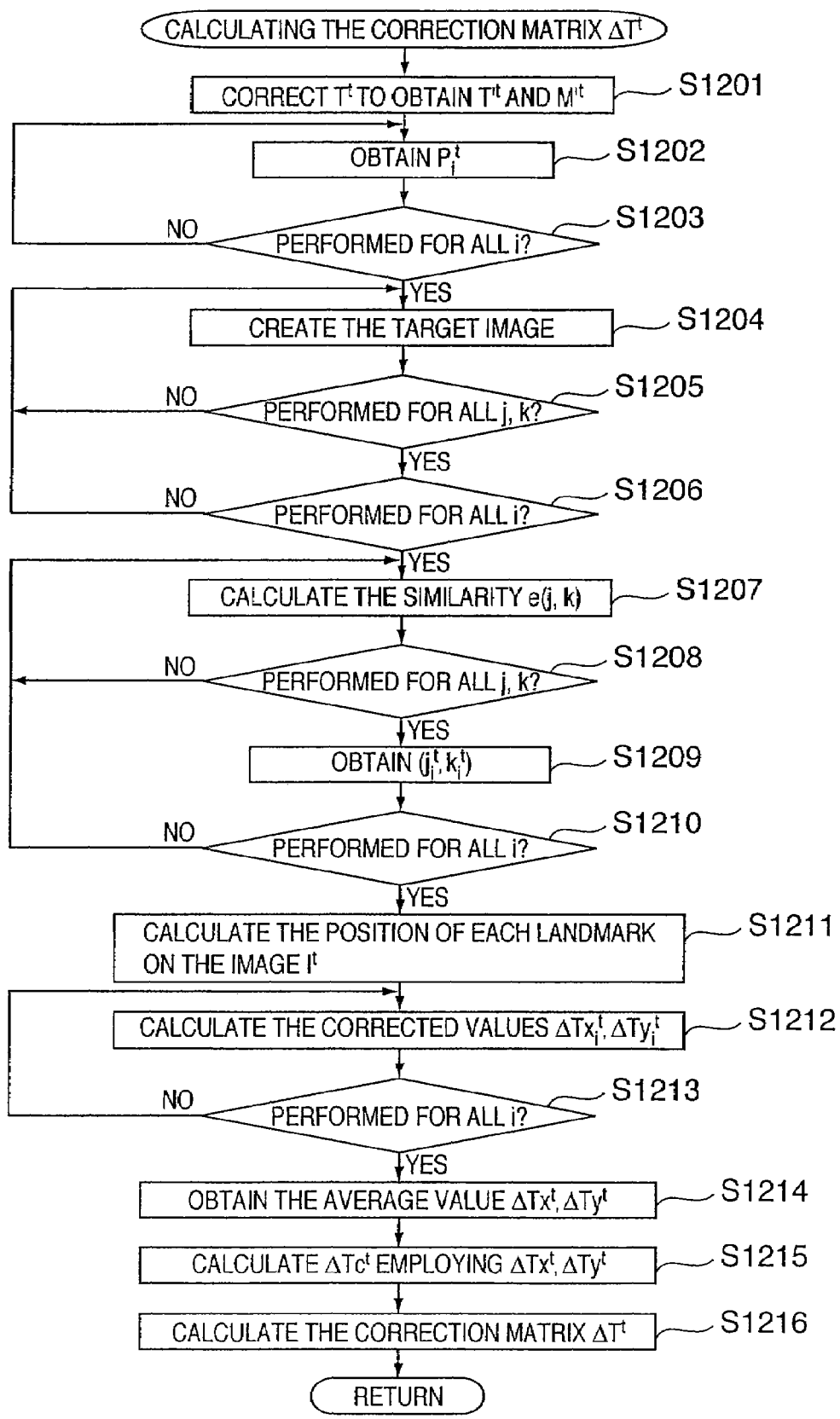
FIG. 12 is a flowchart for a specific process of obtaining a correction matrix$\Delta T^r$.

A correction method on the basis of the above setting in this embodiment will be described below with reference to the FIGS. 11 and 12 showing the flowcharts of the processing for the same method.

FIG. 11 is a flowchart of a main process in this embodiment. The processing from step S1101 to step S1104 is the same as that from step S901 to step S904 in the fourth embodiment, and not described here.

Then, the correction matrix $\Delta T^t$ is obtained (step S1105). FIG. 12 shows a flowchart of the specific processing to obtain the correction matrix $\Delta T^t$, which will be described below.

Firstly, the matrix $T^t$ is corrected with the correction matrix $\Delta T^{t-1}$ already calculated in the prior process, and the matrix $T'^t$ and the matrix $M'^t$ are obtained in the following way (step S1201).

$$T'^t = \Delta T^{t-1} T^t$$

$$M'^t = R^t T'^t$$

The processing from step S1202 to step S1211 is the same as that from step S1002 to step S1012 in the fourth embodiment, and not described here.

Then, at step S1212, the corrected updated values $\Delta Tx_i^t$, $\Delta Ty_i^t$ with regard to the landmark $L_i$ is calculated.

$$\Delta Tx_i^t = f \cdot Zc_i^t (x\$_i^t - x_i^t)$$

$$\Delta Ty_i^t = f \cdot Zc_i^t (y\$_i^t - y_i^t)$$

Herein, $Zc_i^t$ is the z coordinate of landmark in the camera coordinate system, and has the value in the third component of $M'^t P_i$.

The above corrected updated values $\Delta Tx_i^t$, $\Delta Ty_i^t$ are obtained for all i, or all landmarks (step S1213), and the average value $\Delta Tx^t$, $\Delta Ty^t$ of the corrected updated value $\Delta Tx_i^t$, $\Delta Ty_i^t$ for all i is obtained (step S1214). And employing the average value $\Delta Tx^t$, $\Delta Ty^t$ of the corrected updated values obtained, the corrected updated matrix $\Delta Tc^t$ for making parallel movement of $\Delta Tx^t$ in the x direction and $\Delta Ty^t$ in the y direction in the coordinate system is calculated (step S1215). A method for calculating the coordinate transformation matrix for making arbitrary parallel movement to the coordinate system is well known, and not described here. And the correction matrix $\Delta T^t$ is obtained in the following way (step S1216).

$$\Delta T^t = \text{Inv}(R^t) \Delta Tc^t R^t \Delta T^{t-1}$$

After the correction matrix $\Delta T^t$ is calculated in accordance with the process as shown in FIG. 12, the control returns to the main routine of FIG. 11. The model view matrix $M\$^t$ is calculated employing the calculated correction matrix $\Delta T^t$ (step S1106). This calculation is made in accordance with the following Equation.

$$M\$^t = R^t \Delta T^t T^t$$

And CG is drawn and displayed employing the model view matrix calculated in the same way as in the first embodiment (step S1107).

SIXTH EMBODIMENT

In the fifth embodiment, $\Delta Tz$ is assumed to be always 0, and in the case where the visual point position is moved forth or back in the visual line direction, the correct alignment can not be effected. In this embodiment, it is possible to deal with the case that $\Delta Tz$ is not 0 by observing two or more landmarks at all times.

The flowchart of the correction process in this embodiment is basically the same as those of FIGS. 11 and 12 in the fifth embodiment, except that the contents of processing at steps S1214 and S1215 are different. The processing of steps S1214 and S1215 for the correction process in this embodiment will be described below.

Supposing that the corrected updated values in the x, y, and z direction in the camera coordinate system are $\Delta Tx^t$, $\Delta Ty^t$, $\Delta Tz^t$, the following Equation holds between the image pick-up prediction position $p_i^t$ and the detected position $p\$_i^t$ of landmark for each landmark.

$$\Delta Tx^t + x\$_i^t \cdot f \Delta Tz^t = f \cdot Zc_i^t (x\$_i^t - x_i^t)$$

$$\Delta Ty^t + y\$_i^t \cdot f \Delta Tz^t = f \cdot Zc_i^t (y\$_i^t - y_i^t)$$

Therefore, the following simultaneous equations are set up for a plurality of landmarks and solved to calculate the unknown corrected updated values $\Delta Tx^t$, $\Delta Ty^t$, $\Delta Tz^t$ (step S1214).

$$\begin{pmatrix} 1 & 0 & fx\$_1^t \\ 0 & 1 & fy\$_1^t \\ 1 & 0 & fx\$_2^t \\ 0 & 1 & fy\$_2^t \\ \vdots & & \end{pmatrix} \begin{pmatrix} \Delta Tx^t \\ \Delta Ty^t \\ \Delta Tz^t \end{pmatrix} = \begin{pmatrix} fZc_1^t(x\$_1^t - x_1^t) \\ fZc_1^t(y\$_1^t - y_1^t) \\ fZc_2^t(x\$_2^t - x_2^t) \\ fZc_2^t(y\$_2^t - y_2^t) \\ \vdots \end{pmatrix} \quad \text{[Equation 1]}$$

And employing the calculated values $\Delta Tx^t$, $\Delta Ty^t$, $\Delta Tz^t$, the corrected updated matrix $\Delta Tc^t$ is obtained by a well-known method (step S1215). And at step S1216, the correction matrix $\Delta T^t$ is obtained employing the updated matrix $\Delta Tc^t$ obtained in the same manner as in the fifth embodiment.

SEVENTH EMBODIMENT

In the first to sixth embodiments, any one of the rotation and the parallel movement can be only corrected. In this embodiment, both the rotation and the parallel movement are corrected. A basic method involves correcting the parallel movement after correcting the rotation. However, the method is not limited thereto, and may involve correcting the parallel movement and the rotation in reverse order, or repeating correction of parallel movement by a fixed number after correcting the rotation (or in reverse order), or until the error is reduced below a preset threshold or the error variation due to correction is reduced below a threshold.

Herein, the settings for use in this embodiment are listed below.

Rotational component of the model view matrix corrected by the correction matrix obtained at the intermediate stage of process is $R'''^t$.

Model view matrix corrected by the correction matrix obtained at the intermediate stage of process is $M'''^t$.

A correction process in this embodiment on the basis of the above settings will be described below.

Figure 13:
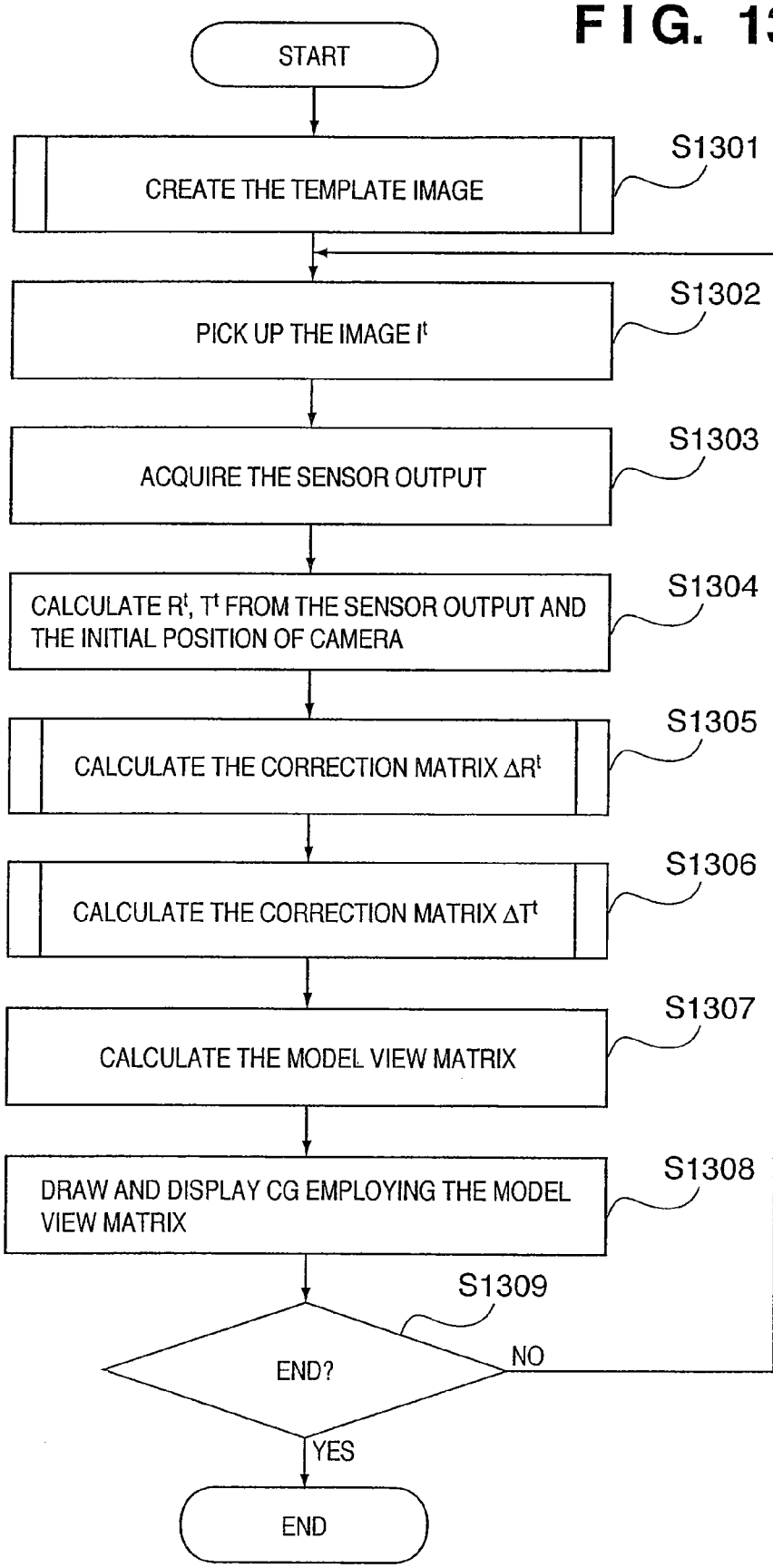
FIG. 13 is a flowchart for a main process in a seventh embodiment of the invention.

FIG. 13 shows a flowchart of a main process in this embodiment. The flowchart in the same figure has a process (step S1306) for calculating the correction matrix $\Delta T^t$ added to the flowchart as shown in FIG. 9 for the fourth embodiment, in which the process (step S1305) for calculating the correction matrix $\Delta R^t$ is different. In the following, the process (step S1306) for calculating the correction matrix $\Delta T^t$ and the process (step S1305) for calculating the correction matrix $\Delta R^t$ in this embodiment will be described. Other parts are not described here.

The flowchart of the specific processing to calculate the correction matrix $\Delta R^t$ at step S1305 is fundamentally the same as that of FIG. 10 in the fourth embodiment, except that the matrix $R'^t$ and $M'^t$, as well as the matrix $T'^t$, are calculated at step S1001 in this embodiment.

$$R'^t = R^t \Delta R^{t-1}$$

$$T'^t = \Delta T^{t-1} T^t$$

$$M'^t = R'^t T'^t$$

And the derived $T'^t$ is employed instead of the fixed value $T^t$ in FIG. 10 in the following steps (e.g., S1014).

On the other hand, the flowchart of the specific processing to correct the correction matrix $\Delta T^t$ at step S1306 is fundamentally the same as that of FIG. 12 in the fifth embodiment, except that at step S1201, the matrix $R^t$ is corrected employing the correction matrix $\Delta R^t$ obtained at step S1305, and the matrix $R'''^t$ and $M'''^t$ are obtained in accordance with the following Equations.

$$R'''^t = R^t \Delta R^t$$

$$M'''^t = R'''^t T'^t$$

In the process of this embodiment, $\Delta Tx_i^t$ and $\Delta Ty_i^t$ are obtained at step S1212 in the flowchart of FIG. 12 in accordance with the following Equations.

$$\Delta Tx_i^t = f \cdot Zc_i^t (x\$_i^t - x_i^t)$$

$$\Delta Ty_i^t = f \cdot Zc_i^t (y\$_i^t - y_i^t)$$

Herein, $Zc_i^t$ is the z coordinate of landmark in the camera coordinate system, and has its value in the third component of $M'''^t P_i$.

Also, in the process of this embodiment, the correction matrix $\Delta T^t$ is calculated at step S1216 in the flowchart of FIG. 12 in accordance with the following Equation.

$$\Delta T^t = \text{Inv}(R'''^t) \Delta Tc^t R'''^t \Delta T^{t-1}$$

And if the calculation of the correction matrix $\Delta T^t$ is ended, the control returns to the flowchart as shown in FIG. 13. At step S1307, the model view matrix $M\$^t$ is calculated in the following way.

$$M\$^t = R^t \Delta R^t \Delta T^t T^t$$

The process (steps S1305, S1306) for obtaining the correction matrix $\Delta R^t$, $\Delta T^t$ may be repeated by a predetermined number of times, as described above.

EIGHTH EMBODIMENT

In the first to seventh embodiments, the position of landmark in the world coordinate system is known, but may be determined by other methods. That is, the position of landmark may be directly specified on the image $I^0$ at an initial positional attitude, or the feature points with remarkable (easily traceable) image features (e.g., edge part or texture part) may be extracted from the image $I^0$ at the initial positional attitude, this position being made the position of landmark.

Herein, an instance is considered in which the image feature picked up at the image coordinates $(x_i^0, y_i^0)$ are designated or detected by manual input or image processing and used as the landmark $L_i$. Assuming that the camera coordinate of this landmark is $Pc_i^0 = (x_i^0, y_i^0, f, 1)$, the world coordinate can be defined as $P_i = \text{Inv}(M^0) Pc_i^0$, employing an inverse matrix of the model view matrix $M^0$ at the initial position attitude, and the methods as described in the first to third embodiments can be directly employed.

Since the information of landmark position in the depth direction can not be obtained, the correction can not be made employing the depth information of landmark position (position correction as described in the fifth embodiment and beyond).

[Modification 1]

In the above embodiments, the attitude (or positional attitude) at the visual point of camera in the MR system is measured. However, this invention is not limited thereto, and may be applied to any uses for measuring the attitude (or positional attitude) at the visual point of camera.

[Modification 2]

In the above embodiments, the MR system of video see-through method is used to measure the attitude (or positional attitude) at the visual point, but the MR system of optical see-through method may be employed to measure the attitude (or positional attitude) with the image processing device of this invention. In this case, an attitude sensor is attached on the HMD, and a camera is mounted on the HMD so that the relative attitude (or positional attitude) at the visual point position of the observer that is a measurement object is known. And the attitude (or positional attitude) of camera is calculated by the same method as in the above embodiments, and transformed to calculate the attitude (or positional attitude) at the visual point of the observer. The applicable scope of this invention is not limited to the object to be measured, but the attitude (or positional attitude) can be measured by mounting the camera and the attitude sensor on any object to be measured in a similar manner.

[Modification 3]

In the above embodiments, the template image is generated on the basis of the image $I^0$ photographed at the predetermined positional attitude in a template image generating module 430. However, the template image may not be generated on the basis of the image $I^0$, but may be stored in advance or obtained by any of well known methods of updating the template dynamically, for example.

[Modification 4]

In the above embodiments, the neighboring area around the prediction position of landmark is only extracted as a target image in a target image generating module 404. However, the object image (i.e., target image) of template matching may not be obtained by extracting the neighboring area around the prediction position of landmark. For example, an image I' consisting of an entire input image being rotated as shown in FIG. 14D may be set as the target image common to each landmark, the prediction position of each landmark being obtained within the I' to make a corresponding search in its neighborhood, or over the entire area of the image I'.

[Modification 5]

In the above embodiments, in order to measure the attitude or positional attitude, the detection of landmark by template matching as one means is employed. However, the landmark detecting method for the image processing device of this invention can be applied without regard to the measurement of the attitude or positional attitude, if the landmark position is detected from the image by template matching.

OTHER EMBODIMENTS

It is needless to say that the object of this invention can be accomplished in such a manner that a storage medium (or a recording medium) recording a program code of software for implementing the functions of the above embodiments is supplied to the system or device, and the computer (or CPU or MPU) of the system or device reads and executes the program code stored in the storage medium. In this case, the program code itself read from the storage medium implements the functions of the above embodiments, and the storage medium storing the program code constitutes this invention. Hence, it will be appreciated that the functions of the above embodiments may be not only implemented by executing the program code read by the computer, but also the operating system (OS) operating on the computer may perform a part or all of the actual processing on the basis of an instruction of the program code, thereby implementing the functions of the above embodiments.

Further, it will be appreciated that the program code read from the storage medium may be written into a memory for a function extension card inserted into the computer or a function extension unit connected to the computer, and the CPU provided in the function extension card or function extension unit may perform a part or all of the actual processing on the basis of an instruction of the program code to implement the functions of the above embodiments.

In the case where this invention is applied to the storage medium, which stores the program code corresponding to the flowcharts as shown in any one of FIGS. 5 to 13 and described previously.

With the above description, it is possible to correct for the measurement errors at the visual point of camera with the attitude sensor, in particular, the accumulated error in the azimuth direction caused along with the elapse of time, whereby the MR without dislocation can be realized.

The invention claimed is:

1. An image processing device in which a position of an index in a picked-up image picked up by an image pick-up device is detected by a template matching process employing a template image of the index, comprising:
    an orientation sensor that measures an orientation of said image pick-up device;
    a prediction position calculation unit that calculates a prediction position of the index in an image picked-up by said image pick-up device on the basis of the measured orientation;
    an extracting unit that sets an area of the picked-up image on the basis of the prediction position of the index, and extracts an image in the set area;
    a rotating unit that rotates the extracted image using a rotation angle in a roll angle, according to the measured orientation, of said image pick-up device, and outputs the rotated image as a target image; and
    a detecting unit that detects the position of the index in the picked-up image by performing the template matching process between the template image and the target image.

2. The image processing device according to claim 1, further comprising:
    a generation unit that generates computer graphics on the basis of the measured orientation;
    a superimposing unit that superimposes the generated computer graphics on the picked-up image; and
    a display unit that displays an image obtained by said superimposing unit.

3. The image processing device according to claim 1, further comprising:
    a correction unit that corrects an orientation measured by said orientation sensor, on the basis of the position detected by said detecting unit.

4. The image processing device according to claim 1, wherein if said extracting unit extracts a plurality of images, said detecting unit detects the position of the index for each extracted image.

5. A computer-implemented image processing method for use with an image processing device in which a position of an index in a picked-up image picked up by an image pick-up device is detected by a template matching process employing a template image of said index, said method comprising:
    an orientation measuring step of measuring the orientation of the image pick-up device;
    a prediction position calculating step of calculating a prediction position of the index in the image picked-up by the image pick-up device on the basis of the measured orientation measured in said orientation measuring step;
    a target image creating step of setting an area of the picked-up image on the basis of the prediction position of the index, extracting an image in the set area rotating the extracted image using a rotation angle in a roll direction, according to the measured orientation, of the image pick-up device, and outputting the rotated image as a target image; and
    a detecting step of detecting the position of the index in the picked-up image by performing the template matching process between the template image and the target image.

6. The image processing method according to claim 5, further comprising:
    a generation step of generating computer graphics on the basis of a measured orientation;
    a superimposing step of superimposing the generated computer graphics on the picked-up image; and
    a display step of displaying an image obtained in said superimposing step.

7. The image processing method according to claim 5, further comprising a correction step of correcting the measured orientation, on the basis of the position detected in said detecting step.

8. The image processing method according to claim 5, wherein if a plurality of images are extracted in said extracting step, the position of the index is detected for each extracted image, in said detecting step.

* * * * *